United States Patent
Behzadi et al.

(10) Patent No.: US 12,547,307 B2
(45) Date of Patent: Feb. 10, 2026

(54) TECHNIQUES AND USER INTERFACES FOR CONTROLLING ONE OR MORE ELECTRONIC DEVICES

(71) Applicant: Apple Inc., Cupertino, CA (US)

(72) Inventors: Arian Behzadi, San Francisco, CA (US); Christopher P. Foss, San Francisco, CA (US); Andrew S. Kim, Walnut Creek, CA (US); David A. Krimsley, Sunnyvale, CA (US); Christopher D. Matthews, San Francisco, CA (US); Corey K. Wang, Palo Alto, CA (US); Gemma A. Roper, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/896,500

(22) Filed: Sep. 25, 2024

(65) Prior Publication Data
US 2025/0110636 A1 Apr. 3, 2025

Related U.S. Application Data

(60) Provisional application No. 63/587,111, filed on Sep. 30, 2023, provisional application No. 63/587,110, filed on Sep. 30, 2023, provisional application No. 63/587,112, filed on Sep. 30, 2023.

(51) Int. Cl.
| | | |
|---|---|---|
| *G06F 3/04845* | (2022.01) | |
| *G06F 3/04812* | (2022.01) | |
| *G06F 3/0482* | (2013.01) | |
| *G06F 3/04847* | (2022.01) | |
| *G06F 3/0487* | (2013.01) | |
| *G06F 3/14* | (2006.01) | |

(52) U.S. Cl.
CPC ...... *G06F 3/04845* (2013.01); *G06F 3/04812* (2013.01); *G06F 3/0482* (2013.01); *G06F 3/04847* (2013.01); *G06F 3/0487* (2013.01); *G06F 3/1454* (2013.01)

(58) Field of Classification Search
None
See application file for complete search history.

(56) References Cited

U.S. PATENT DOCUMENTS

| | | |
|---|---|---|
| 11,553,070 B2 | 1/2023 | Hulbert et al. |
| 2013/0154486 A1 | 6/2013 | Barrilleaux |
| 2014/0075075 A1 | 3/2014 | Morrill et al. |

(Continued)

FOREIGN PATENT DOCUMENTS

| | | |
|---|---|---|
| EP | 2466910 A2 | 6/2012 |
| KR | 2006-0098081 A | 9/2006 |

(Continued)

OTHER PUBLICATIONS

International Patent Application No. PCT/US2024/049120; Invitation to Pay Add'l Fees; dated Dec. 9, 2024; 18 pages.

(Continued)

*Primary Examiner* — Aneeta Yodichkas
(74) *Attorney, Agent, or Firm* — BAKERHOSTETLER; Mark I. Bentley; Kyle B. Morse

(57) ABSTRACT

The present disclosure generally relates to user interfaces and techniques for controlling one or more electronic devices and/or displaying one or more controls in accordance with some examples.

24 Claims, 8 Drawing Sheets

(56) References Cited

U.S. PATENT DOCUMENTS

| | | | |
|---|---|---|---|
| 2015/0126806 | A1 | 5/2015 | Barroso et al. |
| 2015/0339031 | A1 | 11/2015 | Zeinstra et al. |
| 2016/0257198 | A1 | 9/2016 | Buttolo et al. |
| 2017/0052666 | A1 | 2/2017 | Wang et al. |
| 2018/0062691 | A1 | 3/2018 | Barnett, Jr. |
| 2018/0167547 | A1 | 6/2018 | Casey et al. |
| 2018/0253145 | A1 | 9/2018 | Swaminathan et al. |
| 2018/0356946 | A1 | 12/2018 | Chou et al. |
| 2018/0364665 | A1 | 12/2018 | Clymer et al. |
| 2020/0077483 | A1 | 3/2020 | Agarwal et al. |
| 2020/0341553 | A1 | 10/2020 | Moussette et al. |
| 2020/0379730 | A1 | 12/2020 | Graham et al. |
| 2021/0084733 | A1 | 3/2021 | Hamm et al. |
| 2021/0191600 | A1 | 6/2021 | Lemay et al. |
| 2021/0286487 | A1 | 9/2021 | Tyler et al. |
| 2022/0053230 | A1* | 2/2022 | Tchedikian ........ H04N 21/4222 |
| 2022/0075328 | A1 | 3/2022 | Taylor et al. |
| 2022/0083182 | A1 | 3/2022 | Zamora et al. |
| 2022/0100265 | A1 | 3/2022 | Kies et al. |
| 2022/0269333 | A1 | 8/2022 | Dedonato et al. |
| 2022/0300079 | A1 | 9/2022 | Jakes et al. |
| 2023/0076716 | A1* | 3/2023 | Dogrusoz ............... G06F 3/017 |
| 2023/0152906 | A1 | 5/2023 | Jorasch et al. |
| 2023/0343200 | A1 | 10/2023 | Carrigan et al. |
| 2025/0139178 | A1 | 5/2025 | Colflesh et al. |

FOREIGN PATENT DOCUMENTS

| | | |
|---|---|---|
| KR | 102240390 B1 | 4/2021 |
| WO | WO 2022/066177 A1 | 3/2022 |

OTHER PUBLICATIONS

International Patent Application No. PCT/US2024/049119; Invitation to Pay Add'l Fees; dated Dec. 18, 2024; 21 pages.

International Patent Application No. PCT/US2024/049128; Invitation to Pay Add'l Fees; dated Jan. 10, 2025; 25 pages.

International Patent Application No. PCT/US2024/049024; Invitation to Pay Add'l Fees; dated Jan. 17, 2025; 13 pages.

International Patent Application No. PCT/US2024/049120; Int'l Search Report and the Written Opinion; dated Jan. 30, 2025; 10 pages.

International Patent Application No. PCT/US2024/049119; Int'l Search Report and the Written Opinion; dated Feb. 10, 2025; 29 pages.

International Patent Application No. PCT/US2024/049128; Int'l Search Report and the Written Opinion; dated Mar. 3, 2025; 34 pages.

International Patent Application No. PCT/US2024/049024; Int'l Search Report and the Written Opinion; dated Mar. 10, 2025; 20 pages.

International Patent Application No. PCT/US2025/018166; Int'l Search Report and the Written Opinion; dated Aug. 19, 2025; 16 pages.

U.S. Appl. No. 18/896,605; Non-Final Office Action; dated May 28, 2025; 8 pages.

U.S. Appl. No. 18/895,597; Non-Final Office Action; dated Jun. 5, 2025; 24 pages.

International Patent Application No. PCT/US2023/033560; Int'l Search Report and the Written Opinion; dated Jan. 5, 2024; 14 pages.

U.S. Appl. No. 18/643,722; Non-Final Office Action; dated Sep. 12, 2025; 12 pages.

* cited by examiner

TECHNIQUES AND USER INTERFACES FOR CONTROLLING ONE OR MORE ELECTRONIC DEVICES

CROSS-REFERENCE TO RELATED APPLICATIONS

This application claims priority to U.S. Provisional Patent Application Ser. No. 63/587,112 entitled "TECHNIQUES AND USER INTERFACES FOR CONTROLLING ONE OR MORE ELECTRONIC DEVICES," filed Sep. 30, 2023, to U.S. Provisional Patent Application Ser. No. 63/587,110 entitled "TECHNIQUES AND USER INTERFACES FOR DISPLAYING CONTROLS," filed Sep. 30, 2023, and to U.S. Provisional Patent Application Ser. No. 63/587,111 entitled "USER INTERFACES AND TECHNIQUES FOR DISPLAYING INFORMATION," filed Sep. 30, 2023, which are hereby incorporated by reference in their entireties for all purposes.

FIELD

The present disclosure relates generally to computer user interfaces, and more specifically to techniques for controlling electronic devices.

BACKGROUND

Computer systems are often in communication with external electronic devices and/or external computer systems. Computer systems often leverage the communication to control one or more operations of the external electronic devices and/or computer systems.

SUMMARY

Some techniques for controlling electronic devices using computer systems, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for controlling electronic devices. Such methods and interfaces optionally complement or replace other methods for controlling electronic devices. Such methods and interfaces reduce the cognitive burden on a user and produce a more efficient human-machine interface. For battery-operated computing devices, such methods and interfaces conserve power and increase the time between battery charges.

In some embodiments, a method that is performed at a computer system that is in communication with a display component is described. In some embodiments, the method comprises: detecting that the computer system is being pointed in a direction of a first device for at least a predetermined period of time; in response to detecting that the computer system is being pointed in the direction of the first device for at least the predetermined period of time, displaying, via the display component, an indication that the computer system is configured to control the first device; while displaying the indication that the computer system is configured to control the first device, detecting that the computer system is being pointed in a second direction for at least the predetermined period of time, wherein the second direction is different from the first direction; and in response to detecting that the computer system is being pointed in the second direction for at least the predetermined period of time: in accordance with a determination that the second direction is a direction of a second device that can be controlled by the computer system and an input was detected by the computer system while the computer system was pointed in the first direction: displaying, via the display component, an indication that the computer system is configured to control the second device, wherein the second device is different from the first device; and ceasing display of the indication that the computer system is configured to control the first device; and in accordance with a determination that the second direction is not a direction of a respective device that can be controlled by the computer system and the input was detected by the computer system while the computer system was pointed in the first direction, continuing to display the indication that the computer system is configured to control the first device.

In some embodiments, a non-transitory computer-readable storage medium storing one or more programs configured to be executed by one or more processors of a computer system that is in communication with a display component is described. In some embodiments, the one or more programs includes instructions for: detecting that the computer system is being pointed in a direction of a first device for at least a predetermined period of time; in response to detecting that the computer system is being pointed in the direction of the first device for at least the predetermined period of time, displaying, via the display component, an indication that the computer system is configured to control the first device; while displaying the indication that the computer system is configured to control the first device, detecting that the computer system is being pointed in a second direction for at least the predetermined period of time, wherein the second direction is different from the first direction; and in response to detecting that the computer system is being pointed in the second direction for at least the predetermined period of time: in accordance with a determination that the second direction is a direction of a second device that can be controlled by the computer system and an input was detected by the computer system while the computer system was pointed in the first direction: displaying, via the display component, an indication that the computer system is configured to control the second device, wherein the second device is different from the first device; and ceasing display of the indication that the computer system is configured to control the first device; and in accordance with a determination that the second direction is not a direction of a respective device that can be controlled by the computer system and the input was detected by the computer system while the computer system was pointed in the first direction, continuing to display the indication that the computer system is configured to control the first device.

In some embodiments, a transitory computer-readable storage medium storing one or more programs configured to be executed by one or more processors of a computer system that is in communication with a display component is described. In some embodiments, the one or more programs includes instructions for: detecting that the computer system is being pointed in a direction of a first device for at least a predetermined period of time; in response to detecting that the computer system is being pointed in the direction of the first device for at least the predetermined period of time, displaying, via the display component, an indication that the computer system is configured to control the first device; while displaying the indication that the computer system is configured to control the first device, detecting that the computer system is being pointed in a second direction for at least the predetermined period of time, wherein the second direction is different from the first direction; and in response to detecting that the computer system is being pointed in the second direction for at least the predetermined period of time: in accordance with a determination that the second direction is a direction of a second device that can be controlled by the computer system and an input was detected by the computer system while the computer system was pointed in the first direction: displaying, via the display component, an indication that the computer system is configured to control the second device, wherein the second device is different from the first device; and ceasing display of the indication that the computer system is configured to control the first device; and in accordance with a determination that the second direction is not a direction of a respective device that can be controlled by the computer system and the input was detected by the computer system while the computer system was pointed in the first direction, continuing to display the indication that the computer system is configured to control the first device.

In some embodiments, a computer system that is in communication with a display component is described. In some embodiments, the computer system that is in communication with a display component comprises one or more processors and memory storing one or more programs configured to be executed by the one or more processors. In some embodiments, the one or more programs includes instructions for: detecting that the computer system is being pointed in a direction of a first device for at least a predetermined period of time; in response to detecting that the computer system is being pointed in the direction of the first device for at least the predetermined period of time, displaying, via the display component, an indication that the computer system is configured to control the first device; while displaying the indication that the computer system is configured to control the first device, detecting that the computer system is being pointed in a second direction for at least the predetermined period of time, wherein the second direction is different from the first direction; and in response to detecting that the computer system is being pointed in the second direction for at least the predetermined period of time: in accordance with a determination that the second direction is a direction of a second device that can be controlled by the computer system and an input was detected by the computer system while the computer system was pointed in the first direction: displaying, via the display component, an indication that the computer system is configured to control the second device, wherein the second device is different from the first device; and ceasing display of the indication that the computer system is configured to control the first device; and in accordance with a determination that the second direction is not a direction of a respective device that can be controlled by the computer system and the input was detected by the computer system while the computer system was pointed in the first direction, continuing to display the indication that the computer system is configured to control the first device.

In some embodiments, a computer system that is in communication with a display component is described. In some embodiments, the computer system that is in communication with a display component comprises means for performing each of the following steps: detecting that the computer system is being pointed in a direction of a first device for at least a predetermined period of time; in response to detecting that the computer system is being pointed in the direction of the first device for at least the predetermined period of time, displaying, via the display component, an indication that the computer system is configured to control the first device; while displaying the indication that the computer system is configured to control the first device, detecting that the computer system is being pointed in a second direction for at least the predetermined period of time, wherein the second direction is different from the first direction; and in response to detecting that the computer system is being pointed in the second direction for at least the predetermined period of time: in accordance with a determination that the second direction is a direction of a second device that can be controlled by the computer system and an input was detected by the computer system while the computer system was pointed in the first direction: displaying, via the display component, an indication that the computer system is configured to control the second device, wherein the second device is different from the first device; and ceasing display of the indication that the computer system is configured to control the first device; and in accordance with a determination that the second direction is not a direction of a respective device that can be controlled by the computer system and the input was detected by the computer system while the computer system was pointed in the first direction, continuing to display the indication that the computer system is configured to control the first device.

In some embodiments, a computer program product is described. In some embodiments, the computer program product comprises one or more programs configured to be executed by one or more processors of a computer system that is in communication with a display component. In some embodiments, the one or more programs include instructions for: detecting that the computer system is being pointed in a direction of a first device for at least a predetermined period of time; in response to detecting that the computer system is being pointed in the direction of the first device for at least the predetermined period of time, displaying, via the display component, an indication that the computer system is configured to control the first device; while displaying the indication that the computer system is configured to control the first device, detecting that the computer system is being pointed in a second direction for at least the predetermined period of time, wherein the second direction is different from the first direction; and in response to detecting that the computer system is being pointed in the second direction for at least the predetermined period of time: in accordance with a determination that the second direction is a direction of a second device that can be controlled by the computer system and an input was detected by the computer system while the computer system was pointed in the first direction: displaying, via the display component, an indication that the computer system is configured to control the second device, wherein the second device is different from the first device; and ceasing display of the indication that the computer system is configured to control the first device; and in accordance with a determination that the second direction is not a direction of a respective device that can be controlled by the computer system and the input was detected by the computer system while the computer system was pointed in the first direction, continuing to display the indication that the computer system is configured to control the first device.

In some embodiments, a method that is performed at a computer system that is in communication with a display component and one or more input devices is described. In some embodiments, the method comprises: detecting an intent to control a display; and in response to detecting the intent to control the display: in accordance with a determination that the intent to control is directed to a first portion of the display, displaying, via the display component, a first set of one or more controls in the first portion of the display without displaying a second set of one or more controls, wherein the first set of one or more controls includes a first control that, when selected, causes a first device that is associated with a first region and not a second region to perform a first operation; and in accordance with a determination that the intent to control is directed to a second portion of the display that is different from the first portion of the display, displaying, via the display component, the second set of one or more controls in the second portion of the display without displaying the first set of one or more controls, wherein the second set of one or more controls includes a second control that, when selected, causes a second device that is associated with the second region and not the first region to perform a second operation.

In some embodiments, a non-transitory computer-readable storage medium storing one or more programs configured to be executed by one or more processors of a computer system that is in communication with a display component and one or more input devices is described. In some embodiments, the one or more programs includes instructions for: detecting an intent to control a display; and in response to detecting the intent to control the display: in accordance with a determination that the intent to control is directed to a first portion of the display, displaying, via the display component, a first set of one or more controls in the first portion of the display without displaying a second set of one or more controls, wherein the first set of one or more controls includes a first control that, when selected, causes a first device that is associated with a first region and not a second region to perform a first operation; and in accordance with a determination that the intent to control is directed to a second portion of the display that is different from the first portion of the display, displaying, via the display component, the second set of one or more controls in the second portion of the display without displaying the first set of one or more controls, wherein the second set of one or more controls includes a second control that, when selected, causes a second device that is associated with the second region and not the first region to perform a second operation.

In some embodiments, a transitory computer-readable storage medium storing one or more programs configured to be executed by one or more processors of a computer system that is in communication with a display component and one or more input devices is described. In some embodiments, the one or more programs includes instructions for: detecting an intent to control a display; and in response to detecting the intent to control the display: in accordance with a determination that the intent to control is directed to a first portion of the display, displaying, via the display component, a first set of one or more controls in the first portion of the display without displaying a second set of one or more controls, wherein the first set of one or more controls includes a first control that, when selected, causes a first device that is associated with a first region and not a second region to perform a first operation; and in accordance with a determination that the intent to control is directed to a second portion of the display that is different from the first portion of the display, displaying, via the display component, the second set of one or more controls in the second portion of the display without displaying the first set of one or more controls, wherein the second set of one or more controls includes a second control that, when selected, causes a second device that is associated with the second region and not the first region to perform a second operation.

In some embodiments, a computer system that is in communication with a display component and one or more input devices is described. In some embodiments, the computer system that is in communication with a display component and one or more input devices comprises one or more processors and memory storing one or more programs configured to be executed by the one or more processors. In some embodiments, the one or more programs includes instructions for: detecting an intent to control a display; and in response to detecting the intent to control the display: in accordance with a determination that the intent to control is directed to a first portion of the display, displaying, via the display component, a first set of one or more controls in the first portion of the display without displaying a second set of one or more controls, wherein the first set of one or more controls includes a first control that, when selected, causes a first device that is associated with a first region and not a second region to perform a first operation; and in accordance with a determination that the intent to control is directed to a second portion of the display that is different from the first portion of the display, displaying, via the display component, the second set of one or more controls in the second portion of the display without displaying the first set of one or more controls, wherein the second set of one or more controls includes a second control that, when selected, causes a second device that is associated with the second region and not the first region to perform a second operation.

In some embodiments, a computer system that is in communication with a display component and one or more input devices is described. In some embodiments, the computer system that is in communication with a display component and one or more input devices comprises means for performing each of the following steps: detecting an intent to control a display; and in response to detecting the intent to control the display: in accordance with a determination that the intent to control is directed to a first portion of the display, displaying, via the display component, a first set of one or more controls in the first portion of the display without displaying a second set of one or more controls, wherein the first set of one or more controls includes a first control that, when selected, causes a first device that is associated with a first region and not a second region to perform a first operation; and in accordance with a determination that the intent to control is directed to a second portion of the display that is different from the first portion of the display, displaying, via the display component, the second set of one or more controls in the second portion of the display without displaying the first set of one or more controls, wherein the second set of one or more controls includes a second control that, when selected, causes a second device that is associated with the second region and not the first region to perform a second operation.

In some embodiments, a computer program product is described. In some embodiments, the computer program product comprises one or more programs configured to be executed by one or more processors of a computer system that is in communication with a display component and one or more input devices. In some embodiments, the one or more programs include instructions for: detecting an intent to control a display; and in response to detecting the intent to control the display: in accordance with a determination that the intent to control is directed to a first portion of the display, displaying, via the display component, a first set of one or more controls in the first portion of the display without displaying a second set of one or more controls, wherein the first set of one or more controls includes a first control that, when selected, causes a first device that is associated with a first region and not a second region to perform a first operation; and in accordance with a determination that the intent to control is directed to a second portion of the display that is different from the first portion of the display, displaying, via the display component, the second set of one or more controls in the second portion of the display without displaying the first set of one or more controls, wherein the second set of one or more controls includes a second control that, when selected, causes a second device that is associated with the second region and not the first region to perform a second operation.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for controlling electronic devices, thereby increasing the effectiveness, efficiency, and user satisfaction with such devices. Such methods and interfaces may complement or replace other methods for controlling electronic devices.

DESCRIPTION OF THE FIGURES

For a better understanding of the various described embodiments, reference should be made to the Detailed Description below, in conjunction with the following drawings in which like reference numerals refer to corresponding parts throughout the figures.

DETAILED DESCRIPTION

The following description sets forth exemplary techniques for controlling electronic devices. This description is not intended to limit the scope of this disclosure but is instead provided as a description of example implementations.

Users need electronic devices that provide effective techniques for controlling electronic devices. Efficient techniques can reduce a user's mental load when controlling electronic devices. This reduction in mental load can enhance user productivity and make the device easier to use. In some embodiments, the techniques described herein can reduce battery usage and processing time (e.g., by providing user interfaces that require fewer user inputs to operate).

Figure 1:
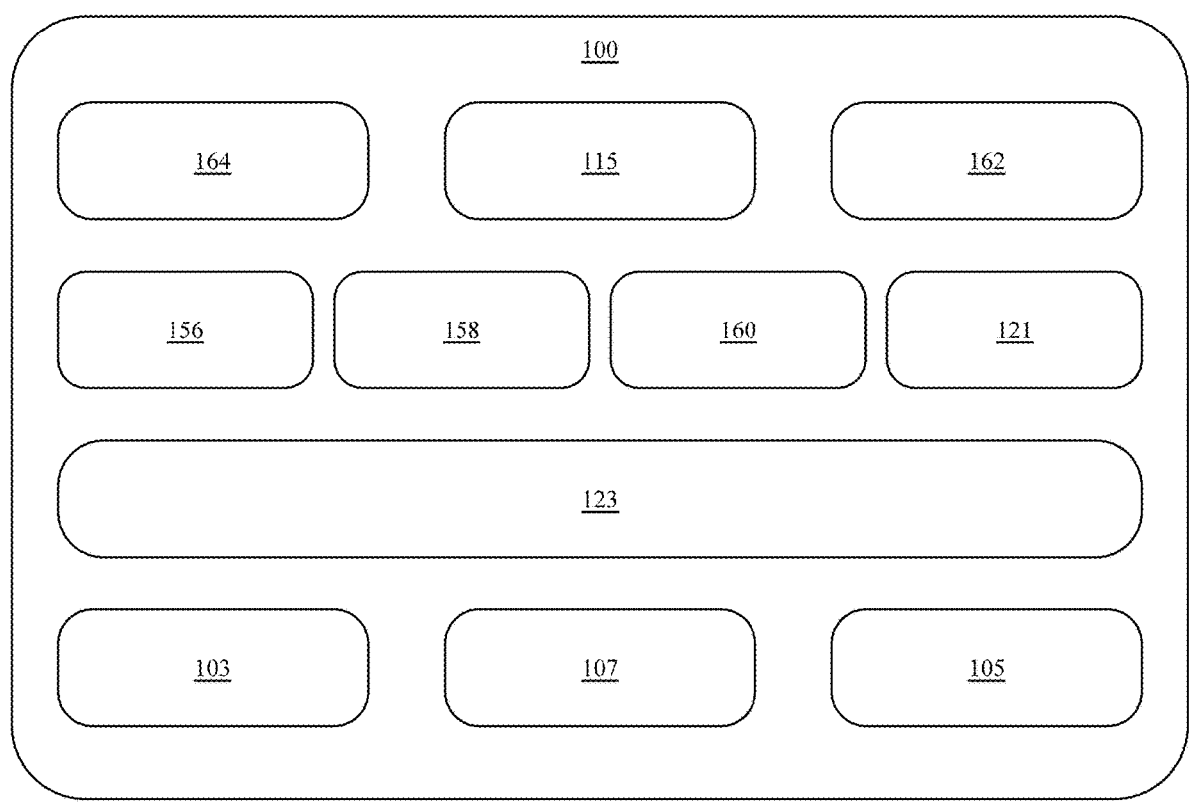
FIG. 1 is a block diagram illustrating a system with various components in accordance with some embodiments.
Figure 3A:
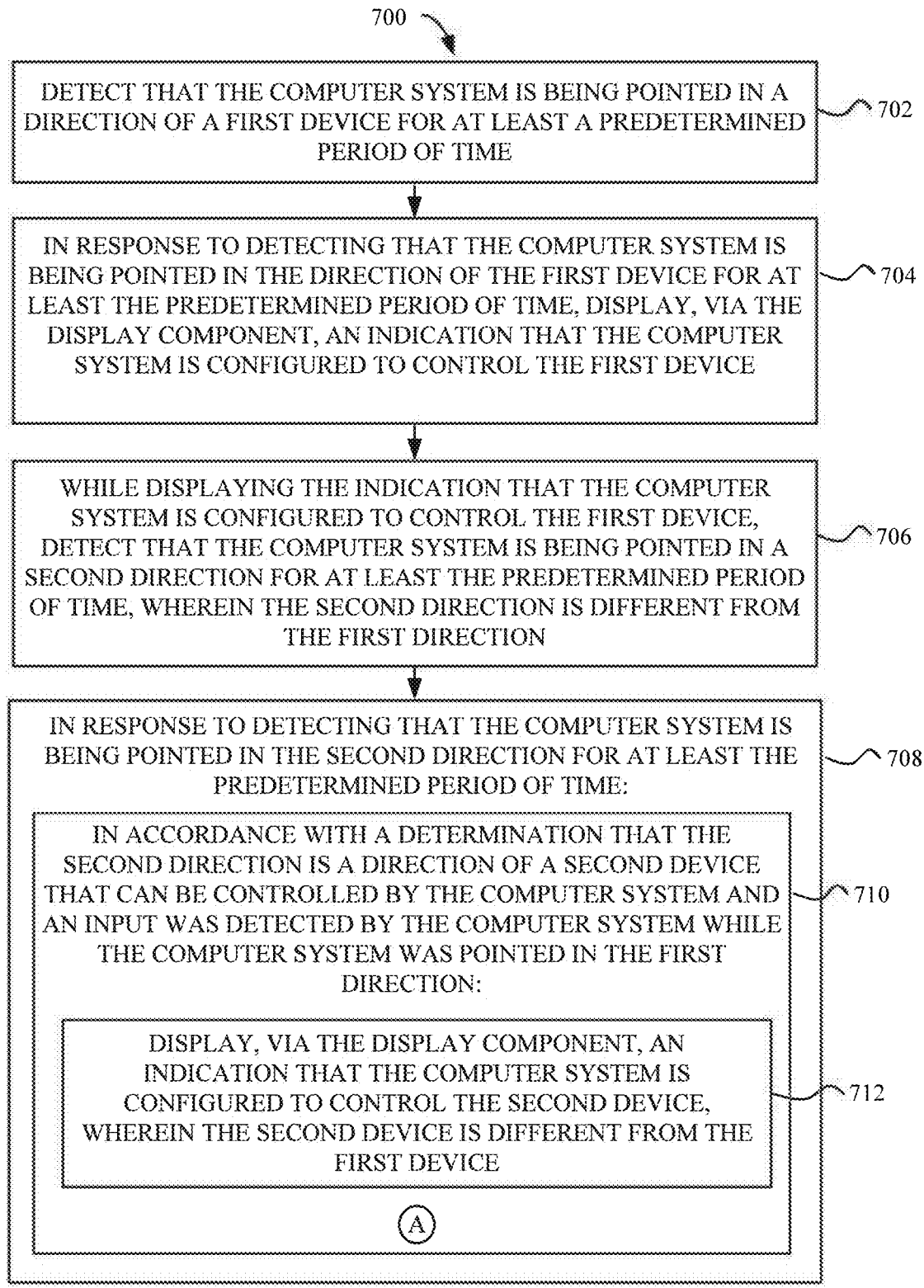
FIGS. 3A-3B is a flow diagram illustrating a method for controlling one or more electronic devices in accordance with some examples.
Figure 3B:
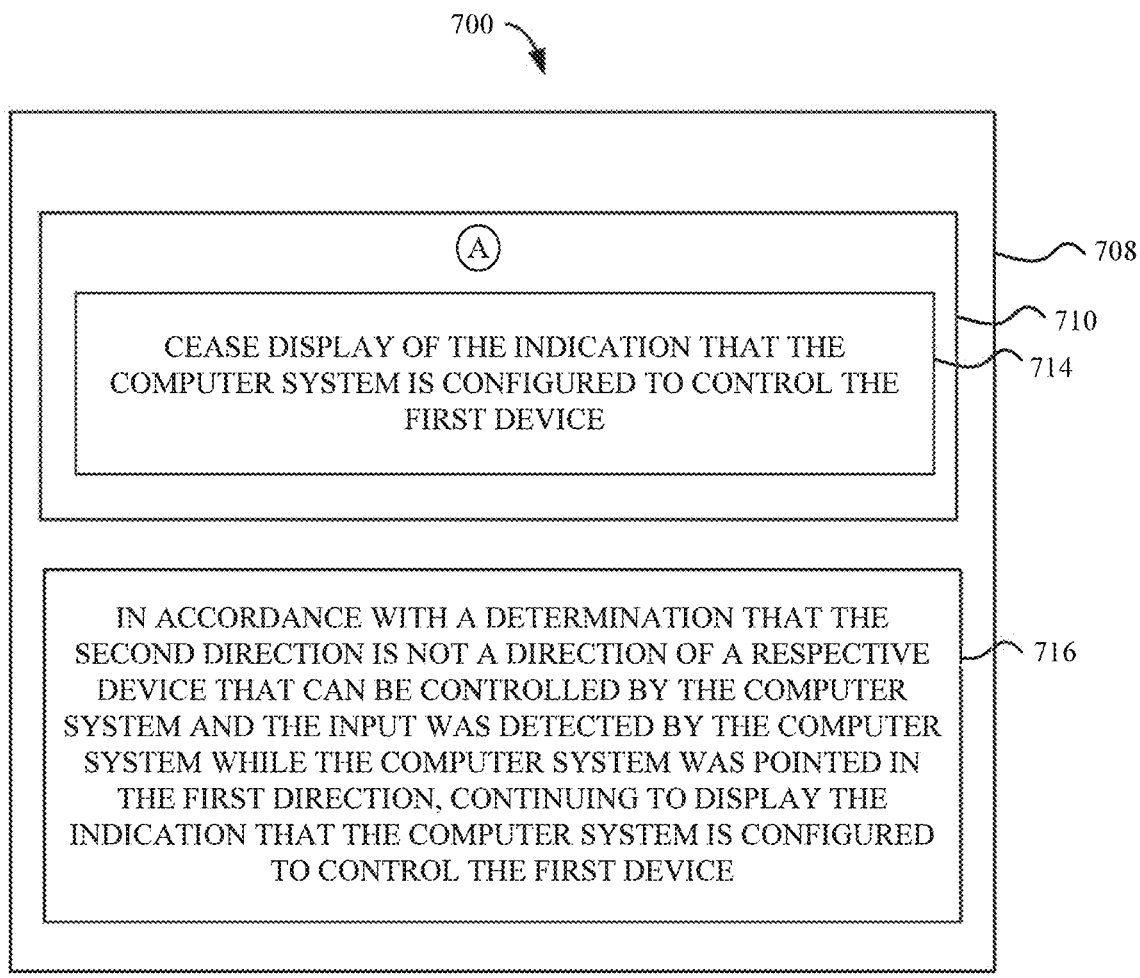
Figure 4:
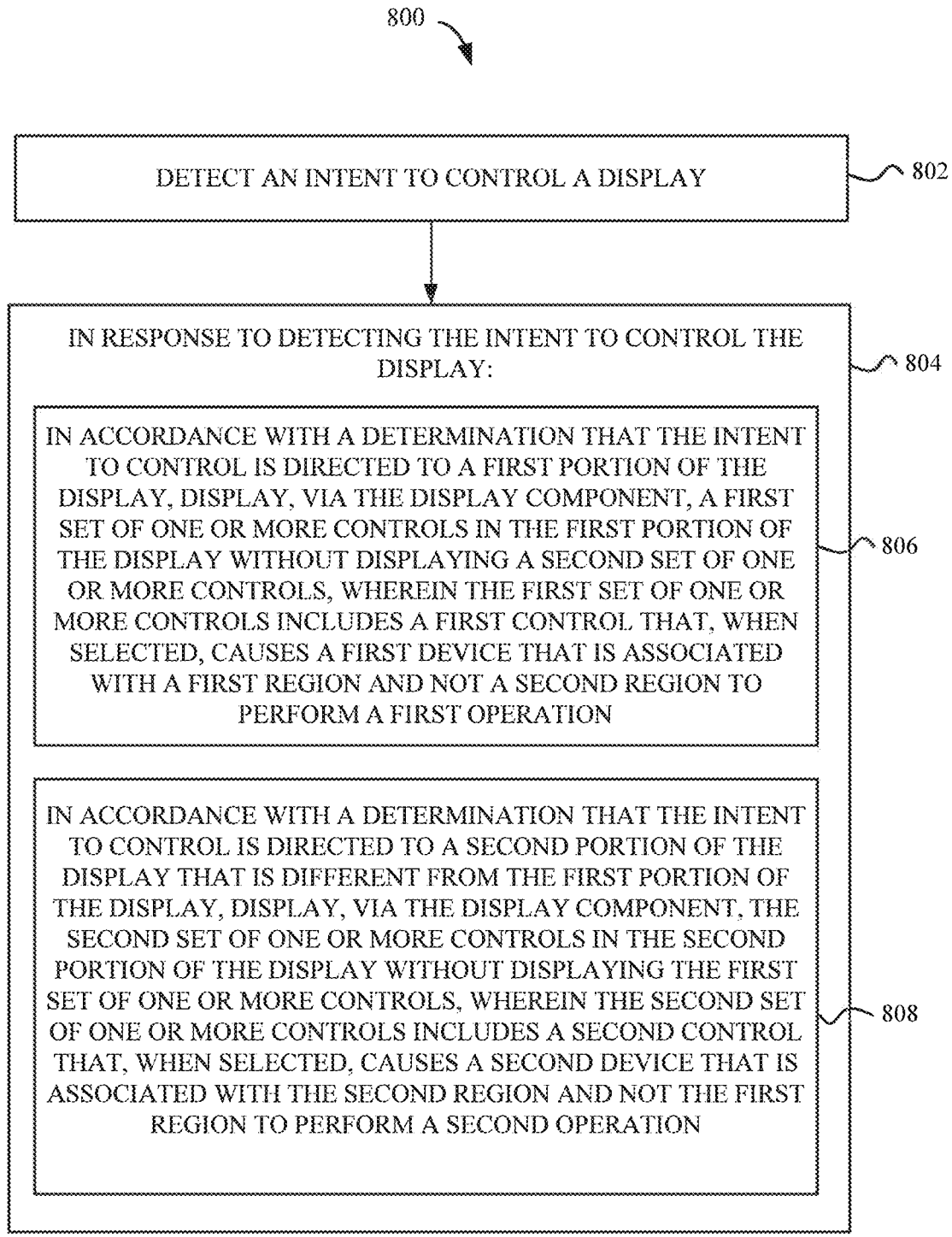
FIG. 4 is a flow diagram illustrating a method for displaying controls in accordance with some examples.

FIG. 1 provides illustrations of exemplary devices for performing techniques for controlling electronic devices. FIGS. 2A-2G illustrate exemplary user interfaces for controlling one or more electronic devices in accordance with some examples. FIGS. 3A-3B is a flow diagram illustrating methods of controlling one or more electronic devices in accordance with some examples. FIG. 4 is a flow diagram illustrating a method for displaying controls in accordance with some examples. The user interfaces in FIGS. 2A-2G are used to illustrate the processes described below, including the processes in FIGS. 3A-3B and 4.

The processes below describe various techniques for making user interfaces and/or human-computer interactions more efficient (e.g., by helping the user to quickly and easily provide inputs and preventing user mistakes when operating a device). These techniques sometimes reduce the number of inputs needed for a user (e.g., a person and/or a user) to perform an operation, provide clear and/or meaningful feedback (e.g., visual, acoustic, and/or haptic feedback) to the user so that the user knows what has happened or what to expect, provide additional information and controls without cluttering the user interface, and/or perform certain operations without requiring further input from the user. Since the user can use a device more quickly and easily, these techniques sometimes improve battery life and/or reduce power usage of the device.

In methods described where one or more steps are contingent on one or more conditions having been satisfied, it should be understood that the described method can be repeated in multiple repetitions so that over the course of the repetitions all of the conditions upon which steps in the method are contingent have been satisfied in different repetitions of the method. For example, if a method requires performing a first step if a condition is satisfied, and a second step if the condition is not satisfied, it should be appreciated that the steps are repeated until the condition has been both satisfied and not satisfied, in no particular order. Thus, a method described with one or more steps that are contingent upon one or more conditions having been satisfied could be rewritten as a method that is repeated until each of the conditions described in the method has been satisfied. This multiple repetition, however, is not required of system or computer readable medium claims where the system or computer readable medium contains instructions for performing conditional operations that require that one or more conditions be satisfied before the operations occur. A person having ordinary skill in the art would also understand that, similar to a method with conditional steps, a system or computer readable storage medium can repeat the steps of a method as many times as are needed to ensure that all of the conditional steps have been performed.

The terminology used in the description of the various embodiments is for the purpose of describing particular embodiments only and is not intended to be limiting.

User interfaces for electronic devices, and associated processes for using these devices, are described below. In some embodiments, the device is a desktop computer with a touch-sensitive surface (e.g., a touch screen display and/or a touchpad). In other embodiments, the device is a portable, movable, and/or mobile electronic device (e.g., a processor, a smart phone, a smart watch, a tablet, a fitness tracking device, a laptop, a head-mounted display (HMD) device, a communal device, a vehicle, a media device, a smart speaker, a smart display, a robot, a television and/or a personal computing device).

In some embodiments, the electronic device is a computer system that is in communication with a display component (e.g., by wireless or wired communication). The display component may be integrated into the computer system or may be separate from the computer system. Additionally, the display component may be configured to provide visual output to a display (e.g., a liquid crystal display, an OLED display, or CRT display). As used herein, "displaying" content includes causing to display the content (e.g., video data rendered or decoded by a display controller) by transmitting, via a wired or wireless connection, data (e.g., image data or video data) to an integrated or external display component to visually produce the content. In some embodiments, visual output is any output that is capable of being perceived by the human eye, including, and not limited to images, videos, graphs, charts, and other graphical representations of data.

In some embodiments, the electronic device is a computer system that is in communication with an audio generation component (e.g., by wireless or wired communication). The audio generation component may be integrated into the computer system or may be separate from the computer system. Additionally, the audio generation component may be configured to provide audio output. Examples of an audio generation component include a speaker, a home theater system, a soundbar, a headphone, an earphone, an earbud, a television speaker, an augmented reality headset speaker, an audio jack, an optical audio output, a Bluetooth audio output, and/or an HDMI audio output). In some embodiments, audio output is any output that is capable of being perceived by the human ear, including, and not limited to sound waves, music, speech, and/or other audible representations of data.

In the discussion that follows, an electronic device that includes particular input and output devices is described. It should be understood, however, that the electronic device optionally includes one or more other input and/or output devices, such as physical user-interface devices (e.g., a physical keyboard, a mouse, and/or a joystick).

FIG. 1 illustrates an example system 100 for implementing techniques described herein. System 100 can perform any of the methods described in FIGS. 3 and/or 4 (e.g., processes 700 and/or 800) and/or portions of these methods.

In FIG. 1, system 100 includes various components, such as processor(s) 103, RF circuitry(ies) 105, memory(ies) 107, sensors 156 (e.g., image sensor(s), orientation sensor(s), location sensor(s), heart rate monitor(s), temperature sensor(s)), input device(s) 158 (e.g., camera(s) (e.g., a periscope camera, a telephoto camera, a wide-angle camera, and/or an ultra-wide-angle camera), depth sensor(s), microphone(s), touch sensitive surface(s), hardware input mechanism(s), and/or rotatable input mechanism(s))), mobility components (e.g., actuator(s) (e.g., pneumatic actuator(s), hydraulic actuator(s), and/or electric actuator(s)), motor(s), wheel(s), movable base(s), rotatable component(s), translation component(s), and/or rotatable base(s)) and output device(s) 160 (e.g., speaker(s), display component(s), audio generation component(s), haptic output device(s), display screen(s), projector(s), and/or touch-sensitive display(s)). These components optionally communicate over communication bus(es) 123 of the system. Although shown as separate components, in some implementations, various components can be combined and function as a single component, such as a sensor can be an input device.

In some embodiments, system 100 is a mobile and/or movable device (e.g., a tablet, a smart phone, a laptop, head-mounted display (HMD) device, and or a smartwatch). In other embodiments, system 100 is a desktop computer, an embedded computer, and/or a server.

In some embodiments, processor(s) 103 includes one or more general processors, one or more graphics processors, and/or one or more digital signal processors. In some embodiments, memory(ies) 107 is one or more non-transitory computer-readable storage mediums (e.g., flash memory and/or random-access memory) that store computer-readable instructions configured to be executed by processor(s) 103 to perform techniques described herein.

In some embodiments, RF circuitry(ies) 105 includes circuitry for communicating with electronic devices and/or networks (e.g., the Internet, intranets, and/or a wireless network, such as cellular networks and wireless local area networks (LANs)). In some embodiments, RF circuitry(ies) 105 includes circuitry for communicating using near-field communication and/or short-range communication, such as Bluetooth® or Ultra-wideband.

In some embodiments, display(s) 121 includes one or more monitors, projectors, and/or screens. In some embodiments, display(s) 121 includes a first display for displaying images to a first eye of a user and a second display for displaying images to a second eye of the user. In such embodiments, corresponding images can be simultaneously displayed on the first display and the second display. Optionally, the corresponding images include the same virtual objects and/or representations of the same physical objects from different viewpoints, resulting in a parallax effect that provides the user with the illusion of depth of the objects on the displays. In some embodiments, display(s) 121 is a single display. In such embodiments, corresponding images are simultaneously displayed in a first area and a second area of the single display for each eye of the user. Optionally, the corresponding images include the same virtual objects and/or representations of the same physical objects from different viewpoints, resulting in a parallax effect that provides a user with the illusion of depth of the objects on the single display.

In some embodiments, system 100 includes touch-sensitive surface(s) 115 for receiving user inputs, such as tap inputs and swipe inputs. In some embodiments, display(s) 121 and touch-sensitive surface(s) 115 form touch-sensitive display(s).

In some embodiments, sensor(s) 156 includes sensors for detecting various conditions. In some embodiments, sensor(s) 156 includes orientation sensors (e.g., orientation sensor(s) 111) for detecting orientation and/or movement of platform 150. For example, system 100 uses orientation sensors to track changes in the location and/or orientation (sometimes collectively referred to as position) of system 100, such as with respect to physical objects in the physical environment. In some embodiments, sensor(s) 156 includes one or more gyroscopes, one or more inertial measurement units, and/or one or more accelerometers. In some embodiments, sensor(s) 156 includes a global positioning sensor (GPS) for detecting a GPS location of platform 150. In some embodiments, sensor(s) 156 includes a radar system, LIDAR system, sonar system, image sensors (e.g., image sensor(s) 109, visible light image sensor(s), and/or infrared sensor(s)), depth sensor(s), rangefinder(s), and/or motion detector(s). In some embodiments, sensor(s) 156 includes sensors that are in an interior portion of system 100 and/or sensors that are on an exterior of system 100. In some embodiments, system 100 uses sensor(s) 156 (e.g., interior sensors) to detect a presence and/or state (e.g., location and/or orientation) of a passenger in the interior portion of system 100. In some embodiments, system 100 uses sensor(s) 156 (e.g., external sensors) to detect a presence and/or state of an object external to system 100. In some embodiments, system 100 uses sensor(s) 156 to receive user inputs, such as hand gestures and/or other air gesture. In some embodiments, system 100 uses sensor(s) 156 to detect the location and/or orientation of system 100 in the physical environment. In some embodiments, system 100 uses sensor(s) 156 to navigate system 100 along a planned route, around obstacles, and/or to a destination location. In some embodiments, sensor(s) 156 include one or more sensors for identifying and/or authenticating a user of system 100, such as a fingerprint sensor and/or facial recognition sensor.

In some embodiments, image sensor(s) includes one or more visible light image sensor, such as charged coupled device (CCD) sensors, and/or complementary metal-oxide-semiconductor (CMOS) sensors operable to obtain images of physical objects. In some embodiments, image sensor(s) includes one or more infrared (IR) sensor(s), such as a passive IR sensor or an active IR sensor, for detecting infrared light. For example, an active IR sensor can include an IR emitter, such as an IR dot emitter, for emitting infrared light. In some embodiments, image sensor(s) includes one or more camera(s) configured to capture movement of physical objects. In some embodiments, image sensor(s) includes one or more depth sensor(s) configured to detect the distance of physical objects from system 100. In some embodiments, system 100 uses CCD sensors, cameras, and depth sensors in combination to detect the physical environment around system 100. In some embodiments, image sensor(s) includes a first image sensor and a second image sensor different form the first image sensor. In some embodiments, system 100 uses image sensor(s) to receive user inputs, such as hand gestures and/or other air gestures. In some embodiments, system 100 uses image sensor(s) to detect the location and/or orientation of system 100 in the physical environment.

In some embodiments, system 100 uses orientation sensor(s) for detecting orientation and/or movement of system 100. For example, system 100 can use orientation sensor(s) to track changes in the location and/or orientation of system 100, such as with respect to physical objects in the physical environment. In some embodiments, orientation sensor(s) includes one or more gyroscopes, one or more inertial measurement units, and/or one or more accelerometers.

In some embodiments, system 100 uses microphone(s) to detect sound from one or more users and/or the physical environment of the one or more users. In some embodiments, microphone(s) includes an array of microphones (including a plurality of microphones) that optionally operate in tandem, such as to identify ambient noise or to locate the source of sound in space (e.g., inside system 100 and/or outside of system 100) of the physical environment.

In some embodiments, input device(s) 158 includes one or more mechanical and/or electrical devices for detecting input, such as button(s), slider(s), knob(s), switch(es), remote control(s), joystick(s), touch-sensitive surface(s), keypad(s), microphone(s), and/or camera(s). In some embodiments, input device(s) 158 include one or more input devices inside system 100. In some embodiments, input device(s) 158 include one or more input devices (e.g., a touch-sensitive surface and/or keypad) on an exterior of system 100.

In some embodiments, output device(s) 160 include one or more devices, such as display(s), monitor(s), projector(s), speaker(s), light(s), and/or haptic output device(s). In some embodiments, output device(s) 160 includes one or more external output devices, such as external display screen(s), external light(s), and/or external speaker(s). In some embodiments, output device(s) 160 includes one or more internal output devices, such as internal display screen(s), internal light(s), and/or internal speaker(s).

In some embodiments, environment controls 162 includes mechanical and/or electrical systems for monitoring and/or controlling conditions of an internal portion (e.g., cabin) of system 100. In some embodiments, environmental controls 162 includes fan(s), heater(s), air conditioner(s), and/or thermostat(s) for controlling the temperature and/or airflow within the interior portion of system 100.

In some embodiments, mobility component(s) includes mechanical and/or electrical components that enable a platform to move and/or assist in the movement of the platform. In some embodiments, mobility system 164 includes powertrain(s), drivetrain(s), motor(s) (e.g., an electrical motor), engine(s), power source(s) (e.g., battery(ies)), transmission(s), suspension system(s), speed control system(s), and/or steering system(s). In some embodiments, one or more elements of mobility component(s) are configured to be controlled autonomously or manually (e.g., via system 100 and/or input device(s) 158).

In some embodiments, system 100 performs monetary transactions with or without another computer system. For example, system 100, or another computer system associated with and/or in communication with system 100 (e.g., via a user account described below), is associated with a payment account of a user, such as a credit card account or a checking account. To complete a transaction, system 100 can transmit a key to an entity from which goods and/or services are being purchased that enables the entity to charge the payment account for the transaction. As another example, system 100 stores encrypted payment account information and transmits this information to entities from which goods and/or services are being purchased to complete transactions.

System 100 optionally conducts other transactions with other systems, computers, and/or devices. For example, system 100 conducts transactions to unlock another system, computer, and/or device and/or to be unlocked by another system, computer, and/or device. Unlocking transactions optionally include sending and/or receiving one or more secure cryptographic keys using, for example, RF circuitry(ies) 105.

In some embodiments, system 100 is capable of communicating with other computer systems and/or electronic devices. For example, system 100 can use RF circuitry(ies) 105 to access a network connection that enables transmission of data between systems for the purpose of communication. Example communication sessions include phone calls, e-mails, SMS messages, and/or videoconferencing communication sessions.

In some embodiments, videoconferencing communication sessions include transmission and/or receipt of video and/or audio data between systems participating in the videoconferencing communication sessions, including system 100. In some embodiments, system 100 captures video and/or audio content using sensor(s) 156 to be transmitted to the other system(s) in the videoconferencing communication sessions using RF circuitry(ies) 105. In some embodiments, system 100 receives, using the RF circuitry(ies) 105, video and/or audio from the other system(s) in the videoconferencing communication sessions, and presents the video and/or audio using output device(s) 160, such as display(s) 121 and/or speaker(s). In some embodiments, the transmission of audio and/or video between systems is near real-time, such as being presented to the other system(s) with a delay of less than 0.1, 0.5, 1, or 3 seconds from the time of capturing a respective portion of the audio and/or video.

In some embodiments, the system 100 generates tactile (e.g., haptic) outputs using output device(s) 160. In some embodiments, output device(s) 160 generates the tactile outputs by displacing a moveable mass relative to a neutral position. In some embodiments, tactile outputs are periodic in nature, optionally including frequency(ies) and/or amplitude(s) of movement in two or three dimensions. In some embodiments, system 100 generates a variety of different tactile outputs differing in frequency(ies), amplitude(s), and/or duration/number of cycle(s) of movement included. In some embodiments, tactile output pattern(s) includes a start buffer and/or an end buffer during which the movable mass gradually speeds up and/or slows down at the start and/or at the end of the tactile output, respectively.

In some embodiments, tactile outputs have a corresponding characteristic frequency that affects a "pitch" of a haptic sensation that a user feels. For example, higher frequency(ies) corresponds to faster movement(s) by the moveable mass whereas lower frequency(ies) corresponds to slower movement(s) by the moveable mass. In some embodiments, tactile outputs have a corresponding characteristic amplitude that affects a "strength" of the haptic sensation that the user feels. For example, higher amplitude(s) corresponds to movement over a greater distance by the moveable mass, whereas lower amplitude(s) corresponds to movement over a smaller distance by the moveable mass. In some embodiments, the "pitch" and/or "strength" of a tactile output varies over time.

In some embodiments, tactile outputs are distinct from movement of system 100. For example, system 100 can includes tactile output device(s) that move a moveable mass to generate tactile output and can include other moving part(s), such as motor(s), wheel(s), axel(s), control arm(s), and/or brakes that control movement of system 100. Although movement and/or cessation of movement of system 100 generates vibrations and/or other physical sensations in some situations, these vibrations and/or other physical sensations are distinct from tactile outputs. In some embodiments, system 100 generates tactile output independent from movement of system 100 For example, system 100 can generate a tactile output without accelerating, decelerating, and/or moving system 100 to a new position.

In some embodiments, system 100 detects gesture input(s) made by a user. In some embodiments, gesture input(s) includes touch gesture(s) and/or air gesture(s), as described herein. In some embodiments, touch-sensitive surface(s) 115 identify touch gestures based on contact patterns (e.g., different intensities, timings, and/or motions of objects touching or nearly touching touch-sensitive surface(s) 115). Thus, touch-sensitive surface(s) 115 detect a gesture by detecting a respective contact pattern. For example, detecting a finger-down event followed by detecting a finger-up (e.g., liftoff) event at (e.g., substantially) the same position as the finger-down event (e.g., at the position of a user interface element) can correspond to detecting a tap gesture on the user interface element. As another example, detecting a finger-down event followed by detecting movement of a contact, and subsequently followed by detecting a finger-up (e.g., liftoff) event can correspond to detecting a swipe gesture. Additional and/or alternative touch gestures are possible.

In some embodiments, an air gesture is a gesture that a user performs without touching input device(s) 158. In some embodiments, air gestures are based on detected motion of a portion (e.g., a hand, a finger, and/or a body) of a user through the air. In some embodiments, air gestures include motion of the portion of the user relative to a reference. Example references include a distance of a hand of a user relative to a physical object, such as the ground, an angle of an arm of the user relative to the physical object, and/or movement of a first portion (e.g., hand or finger) of the user relative to a second portion (e.g., shoulder, another hand, or another finger) of the user. In some embodiments, detecting an air gesture includes detecting absolute motion of the portion of the user, such as a tap gesture that includes movement of a hand in a predetermined pose by a predetermined amount and/or speed, or a shake gesture that includes a predetermined speed or amount of rotation of a portion of the user.

In some embodiments, detecting one or more inputs includes detecting speech of a user. In some embodiments, system 100 uses one or more microphones of input device(s) 158 to detect the user speaking one or more words. In some embodiments, system 100 parses and/or communicates information to one or more other systems to determine contents of the speech of the user, including identifying words and/or obtaining a semantic understanding of the words. For example, system processor(s) 103 can be configured to perform natural language processing to detect one or more words and/or determine a likely meaning of the one or more words in the sequence spoken by the user. Additionally or alternatively, in some embodiments, the system 100 determines the meaning of the one or more words in the sequence spoken based upon a context of the user determined by the system 100.

In some embodiments, system 100 outputs spatial audio via output device(s) 160. In some embodiments, spatial audio is output in a particular position. For example, system 100 can play a notification chime having one or more characteristics that cause the notification chime to be generated as if emanating from a first position relative to a current viewpoint of a user (e.g., "spatializing" and/or "spatialization" including audio being modified in amplitude, filtered, and/or delayed to provide a perceived spatial quality to the user).

In some embodiments, system 100 presents visual and/or audio feedback indicating a position of a user relative to a current viewpoint of another user, thereby informing the other user about an updated position of the user. In some embodiments, playing audio corresponding to a user includes changing one or more characteristics of audio obtained from another computer system to mimic an effect of placing an audio source that generates the play back of audio within a position corresponding to the user, such as a position within a three-dimensional environment that the user moves to, spawns at, and/or is assigned to. In some embodiments, a relative magnitude of audio at one or more frequencies and/or groups of frequencies is changed, one or more filters are applied to audio (e.g., directional audio filters), and/or the magnitude of audio provided via one or more channels are changed (e.g., increased or decreased) to create the perceived effect of the physical audio source. In some embodiments, the simulated position of the simulated audio source relative to a floor of the three-dimensional environment matches an elevation of a head of a participant providing audio that is generated by the simulated audio source, or is a predetermined one or more elevations relative to the floor of the three-dimensional environment. In some embodiments, in accordance with a determination that the position of the user will correspond to a second position, different from the first position, and that one or more first criteria are satisfied, system 100 presents feedback including generating audio as if emanating from the second position.

In some embodiments, system 100 communicates with one or more accessory devices. In some embodiments, one or more accessory devices is integrated with system 100. In some embodiments, one or more accessory devices is external to system 100. In some embodiments, system 100 communicates with accessory device(s) using RF circuitry(ies) 105 and/or using a wired connection. In some embodiments, system 100 controls operation of accessory device(s), such as door(s), window(s), lock(s), speaker(s), light(s), and/or camera(s). For example, system 100 can control operation of a motorized door of system 100. As another example, system 100 can control operation of a motorized window included in system 100. In some embodiments, accessory device(s), such as remote control(s) and/or other computer systems (e.g., smartphones, media players, tablets, computers, and/or wearable devices) functioning as input devices control operations of system 100. For example, a wearable device (e.g., a smart watch) functions as a key to initiate operation of an actuation system of system 100. In some embodiments, system 100 acts as an input device to control operations of another system, device, and/or computer, such as the system 100 functioning as a key to initiate operation of an actuation system of a platform associated with another system, device, and/or computer.

In some embodiments, digital assistant(s) help a user perform various functions using system 100. For example, a digital assistant can provide weather updates, set alarms, and perform searches locally and/or using a network connection (e.g., the Internet) via a natural-language interface. In some embodiments, a digital assistant accepts requests at least partially in the form of natural language commands, narratives, requests, statements, and/or inquiries. In some embodiments, a user requests an informational answer and/or performance of a task using the digital assistant. For example, in response to receiving the question "What is the current temperature?," the digital assistant answers "It is 30 degrees." As another example, in response to receiving a request to perform a task, such as "Please invite my family to dinner tomorrow," the digital assistant can acknowledge the request by playing spoken words, such as "Yes, right away," and then send the requested calendar invitation on behalf of the user to each family member of the user listed in a contacts list for the user. In some embodiments, during performance of a task requested by the user, the digital assistant engages with the user in a sustained conversation involving multiple exchanges of information over a period of time. Other ways of interacting with a digital assistant are possible to request performance of a task and/or request information. For example, the digital assistant can respond to the user in other forms, e.g., displayed alerts, text, videos, animations, music, etc. In some embodiments, the digital assistant includes a client-side portion executed on system 100 and a server-side portion executed on a server in communication with system 100. The client-side portion can communicate with the server through a network connection using RF circuitry(ies) 105. The client-side portion can provide client-side functionalities, input and/or output processing and/or communication with the server, for example. In some embodiments, the server-side portion provides server-side functionalities for any number client-side portions of multiple systems.

In some embodiments, system 100 is associated with one or more user accounts. In some embodiments, system 100 saves and/or encrypts user data, including files, settings, and/or preferences in association with particular user accounts. In some embodiments, user accounts are password-protected and system 100 requires user authentication before accessing user data associated with an account. In some embodiments, user accounts are associated with other system(s), device(s), and/or server(s). In some embodiments, associating one user account with multiple systems enables those systems to access, update, and/or synchronize user data associated with the user account. For example, the systems associated with a user account can have access to purchased media content, a contacts list, communication sessions, payment information, saved passwords, and other user data. Thus, in some embodiments, user accounts provide a secure mechanism for a customized user experience.

Attention is now directed towards embodiments of user interfaces ("UI") and associated processes that are implemented on a computer system, such as system 100.

FIGS. 2A-2G illustrate exemplary user interfaces for controlling one or more electronic devices in accordance with some examples. The user interfaces in these figures are used to illustrate the processes described below, including the processes in FIGS. 3-4.

Figure 2A:
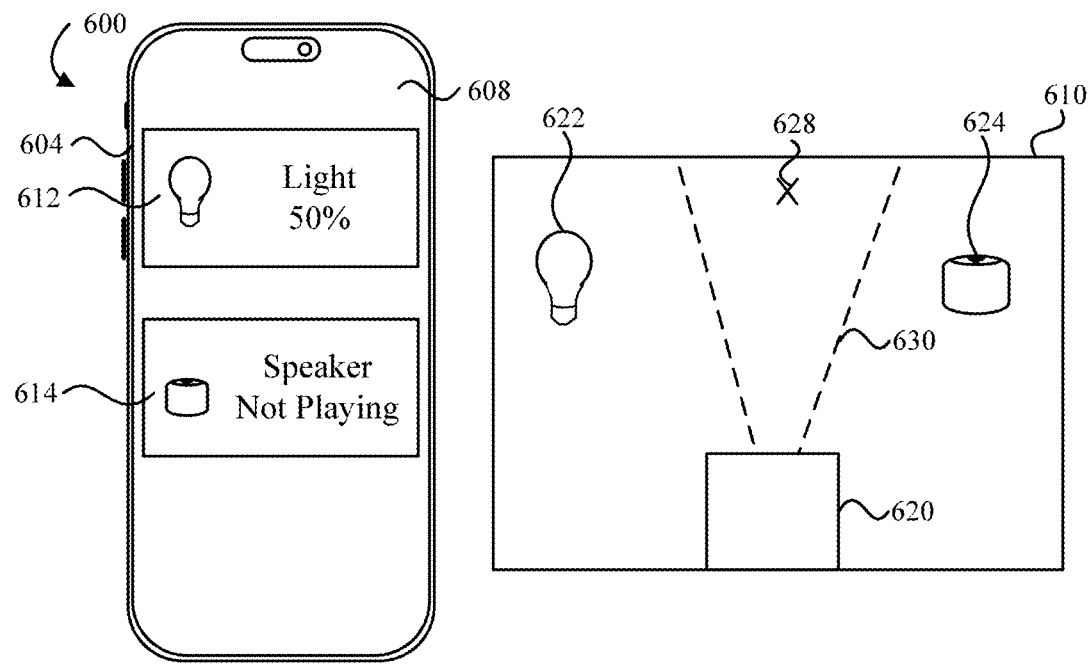
FIGS. 2A-2G illustrate exemplary user interfaces for controlling one or more electronic devices in accordance with some examples.

FIG. 2A illustrates computer system 600, which is a smartphone and includes display 608 (e.g., a display component). However, it should be understood that the types of computer systems and components described herein are merely exemplary and are provided to give context to the examples described herein. In some embodiments, computer system 600 includes a knob, a dial, a joystick, touch-sensitive surface, button, a slider. In some embodiments, computer system 600 is a television, projector, monitor, a remote control, a head-mounted display (HMD) device, a smart display, laptop, and/or personal computer. In some embodiments, computer system 600 includes one or more components of system 100.

As illustrated in FIG. 2A, computer system 600 displays controls user interface 604. Controls user interface 604 includes light control user interface object 612 and speaker control user interface object 614. Light control user interface object 612 corresponds to one or more light devices (e.g., external to computer system 600) (e.g., the one or more light devices are not integrated into computer system 600) that is in communication (e.g., wired and/or wireless (e.g., Wi-Fi, Bluetooth, and/or Ultra-Wideband) communication) with computer system 600. Further, speaker control user interface object 614 corresponds to one or more speaker devices (e.g., external to computer system 600) (e.g., the one or more speaker devices are not integrated into computer system 600) that are in communication (e.g., wired and/or wireless (e.g., Wi-Fi, Bluetooth, and/or Ultra-Wideband) communication) with computer system 600. In some embodiments, computer system 600, the one or more light devices that correspond to light control user interface object 612, and the one or more speaker devices that correspond to speaker control user interface object 614 are all coupled to a common external structure (e.g., a house, an apartment, an airplane, a boat, and/or a car). In some embodiments, the one or more light devices and the one or more speaker devices are integrated into computer system 600. In some embodiments, the one or more lights devices and/or speaker devices are other types of devices, such as smart windows, smart blinds, smart phones, smart watches, fitness tracking devices, smart thermostats, smart heaters, and/or smart air conditioners.

At FIG. 2A, light control user interface object 612 indicates the status of the one or more light devices, and speaker control user interface object 614 indicates the status of the one or more speaker devices. As illustrated in FIG. 2A, light control user interface object 612 indicates that the one or more light devices are operating at 50% power. Further, as illustrated in FIG. 2A, speaker control user interface object 614 indicates that the one or more speaker devices are not outputting audio corresponding to a media item. The display of light control user interface object 612 and speaker control user interface object 614 is dynamic. That is, the display of light control user interface object 612 and speaker control user interface object 614 update as the operation of the one or more speaker devices and/or the operation of the one or more light devices update (e.g., the brightness of the one or more light devices are changed and/or the volume of the playback of a media item on the one or more speaker devices is changed).

FIG. 2A includes schematic 610, which is a visual aid that illustrates the orientation and location of computer system 600 relative to the orientation and location of the one or more light devices that correspond to light control user interface object 612 and the one or more speaker devices that correspond to speaker control user interface object 614. As illustrated in FIG. 2A, schematic 610 includes representation of computer system 620, representation of one or more light devices 622, and representation of one or more speaker devices 624. The positioning and orientation of representation of computer system 620 corresponds to the positioning and orientation of computer system 600, the positioning and orientation of representation of light devices 622 corresponds to the positioning and orientation of the one or more light devices (e.g., that correspond to light control user interface object 612), and the positioning and orientation of representation of speaker device 624 corresponds to the positioning and orientation of the one or more speaker devices (e.g., that correspond to speaker control user interface object 614).

As illustrated in FIG. 2A, schematic 610 also includes location indicator 628 and field-of-detection indicator 630. Field-of-detection indicator 630 corresponds to the field-of-detection of computer system 600 (e.g., field-of-view of one or more sensors, such as a camera; field-of-detection of one or more sensors, such as a microphone; and/or field-of-signal-transfer, such as a speaker and/or a wire signal generator), and location indicator 628 indicates the direction at which computer system 600 is directed. As illustrated in FIG. 2A, schematic 610 depicts that neither representation of light devices 622 nor representation of one or more speaker devices 624 is within field-of-detection indicator 630 and location indicator 628 is positioned between representation of light devices 622 and representation of one or more speaker devices 624. Accordingly, at FIG. 2A, the one or more light devices and the one or more speaker devices are not within, the field-of-detection of computer system 600, and computer system 600 is directed to (e.g., directed at, pointed in the direction of, and/or center of the field-of-detection is directed to) a position that is in between the one or more light devices and the one or more speaker devices. In some embodiments, both representation of light device 622 and representation of representation of speaker device 624 are within field-of-detection indicator 630. In some examples location indicator 628 represents a gaze location of a user (e.g., where a user is looking at a point in time and/or where the user will be looking at a point in time and/or within a period of time). In some embodiments, field-of-detection indicator 630 represents the user's field of view and/or a viewpoint of a head-mounted display device. In some embodiments, computer system 600 displays light control user interface object 612 and/or speaker control user interface object 614 in response to computer system 600 detecting that computer system 600 is directed to the one or more light devices and/or the one or more speaker devices. In some embodiments, computer system 600 displays light control user interface object 612 and speaker control user interface object 614 prior to a determination being made (e.g., by computer system 600) that computer system 600 is directed to the one or more light devices and/or the one or more speaker devices. In some embodiments, field-of-detection indicator 630 corresponds to the field-of-view of one or more cameras that are integrated into computer system 600. In some embodiments, field-of-detection indicator 630 corresponds to the field-of-detection of a user of computer system 600. At FIG. 2A, computer system 600 is moved to the left within the physical environment.

Figure 2B:
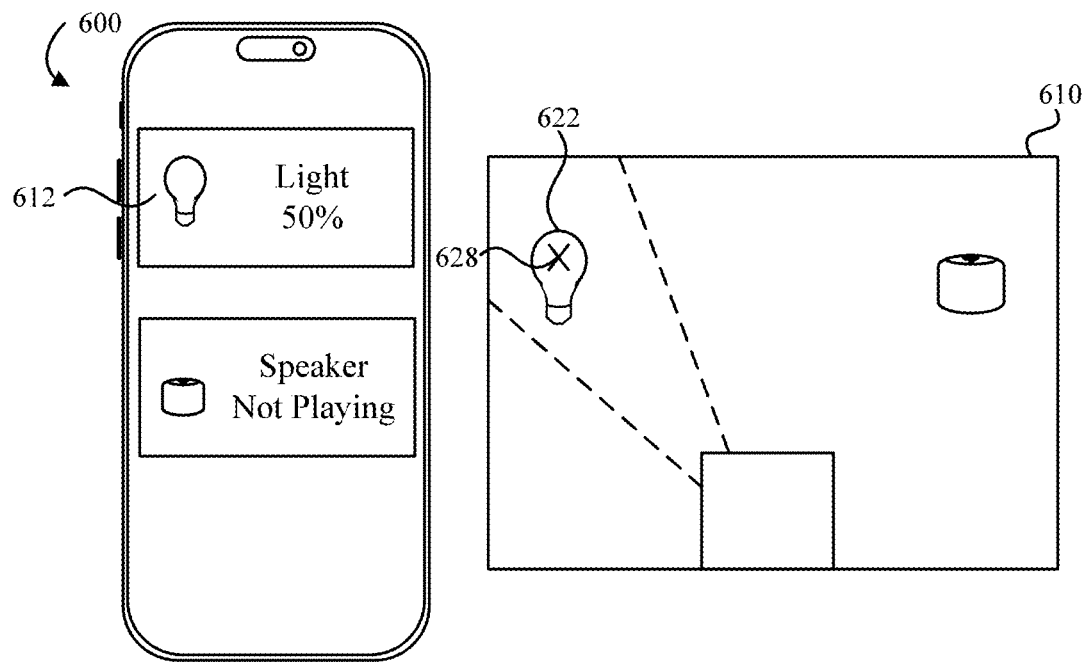

At FIG. 2B, after computer system 600 is moved (or moves) to the left within the physical environment, computer system 600 is directed to the one or more light devices that correspond to representation of light devices 622 (e.g., as illustrated by location indicator 628 in schematic 610). At FIG. 2B, a determination is made that computer system 600 is directed to the one or more light devices for less than a predetermined period of time (e.g., 0.5, 1, 3, 5, 7, 10, 15, 20, 25, or 30 seconds). At FIG. 2B, because a determination is made that computer system 600 is directed to the one or more light devices for less than the predetermined period of time, computer system 600 does not expand the display of light control user interface object 612.

Figure 2C:
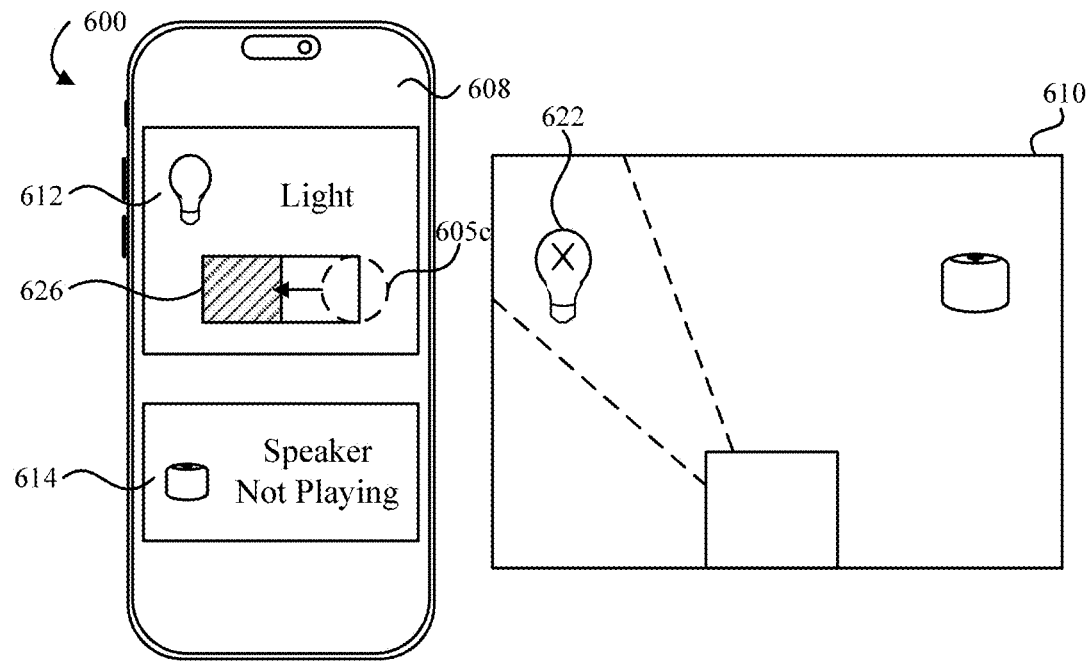

At FIG. 2C, as illustrated by schematic 610, computer system 600 remains directed to the one or more light devices that correspond to light control user interface object 612. At FIG. 2C, a determination is made that computer system 600 has been directed to the one or more light devices that correspond to light control user interface object 612 for the predetermined period of time (and/or, In some embodiments, for more than a predetermined period of time). At FIG. 2C, because a determination is made that computer system 600 has been directed to the one or more light devices for the predetermined period of time, computer system 600 expands the display of light control user interface object 612. Accordingly, as illustrated in FIG. 2C, computer system 600 displays light control user interface object 612 as expanded (e.g., in contrast to the non-expanded display of light control user interface object 612 at FIG. 2B).

As illustrated in FIG. 2C, as a part of displaying light control user interface object 612 as expanded, computer system 600 displays power control user interface object 626 within light control user interface object 612. The display of power control user interface object 626 indicates that computer system 600 is configured to control the one or more light devices that correspond to light control user interface object 612. That is, as described in greater detail below, while computer system 600 displays power control user interface object 626, computer system 600 is configured to transmit one or more instructions to the one or more light devices. Computer system 600 transmits these instructions in response to detecting input on the power control user interface object 626. In some embodiments, in response to detecting that a user is gazing (e.g., via one or more external cameras) at the one or more light devices (and/or that computer system 600 is directed to one or more light devices), computer system 600 displays power control user interface object 626. In some embodiments, in response to detecting that a user is gazing at the one or more light devices (e.g., via one or more external cameras) (e.g., and computer system 600 does not detect that computer system is directed to the one or more light devices), computer system 600 displays power control user interface object 626.

At FIG. 2C, the display of power control user interface object 626 corresponds to the power level of the one or more light devices. As illustrated in FIG. 2C, computer system 600 displays power control user interface object 626 as halfway filled. Accordingly, at FIG. 2C, the one or more light devices are operating at 50% power. The display of power control user interface object 626 is dynamic. That is, the display of power control user interface object 626 updates as the operation of the one or more light devices change (e.g., the brightness of the one or more light devices are changed).

At FIG. 2C, computer system 600 is moved to the right such that computer system 600 is no longer directed to the one or more light devices. In some embodiments, when computer system 600 is directed to both the one or more light devices and the one or more speaker devices for the predetermined amount of time, computer system 600 concurrently displays light control user interface object 612 and speaker control user interface object 614 as expanded. In some embodiments, computer system 600 does not expand the display of light control user interface object 612 in response to a determination that computer system 600 is directed to the one or more light devices for the predetermined period of time. In examples where computer system 600 does not expand the display of light control user interface object 612, computer system 600 displays power control user interface object 626 on a portion of display 608 that does not overlap with the display of light control user interface object 612 (e.g., computer system 600 displays power control user interface object 626 below or above light control user interface object 612). In some embodiments, computer system 600 ceases to display speaker control user interface object 614 as a part of expanding the display of light control user interface object 612. In some embodiments, computer system 600 expands speaker control user interface object 614 in response to detecting an input directed to speaker control user interface object 614 while computer system 600 remains directed to light devices 622. In some embodiments, computer system 600 continues to display light control user interface object 612 as unexpanded in response to computer system 600 detecting an input directed to speaker control user interface object 614 while computer system 600 remains directed to light devices 622.

At FIG. 2C, while computer system 600 is directed to the one or more light devices that correspond to light control user interface object 612, computer system 600 detects input 605*c* that corresponds to a swipe input on the display of power control user interface object 626. In some embodiments, input 605*c* can correspond to a tap input, swipe input, voice command, long press (e.g., tap and hold), a rotational input, a swipe input, an air gesture, a gaze input and/or hand gesture, mouse clicks, and/or head movement inputs. In some embodiments, other inputs described below in relation to FIGS. 2C-2F can alternatively be one or more other types of inputs, such as a rotational input, a swipe input, a tap input, an air gesture, a voice input, and/or a gaze input.

Figure 2D:
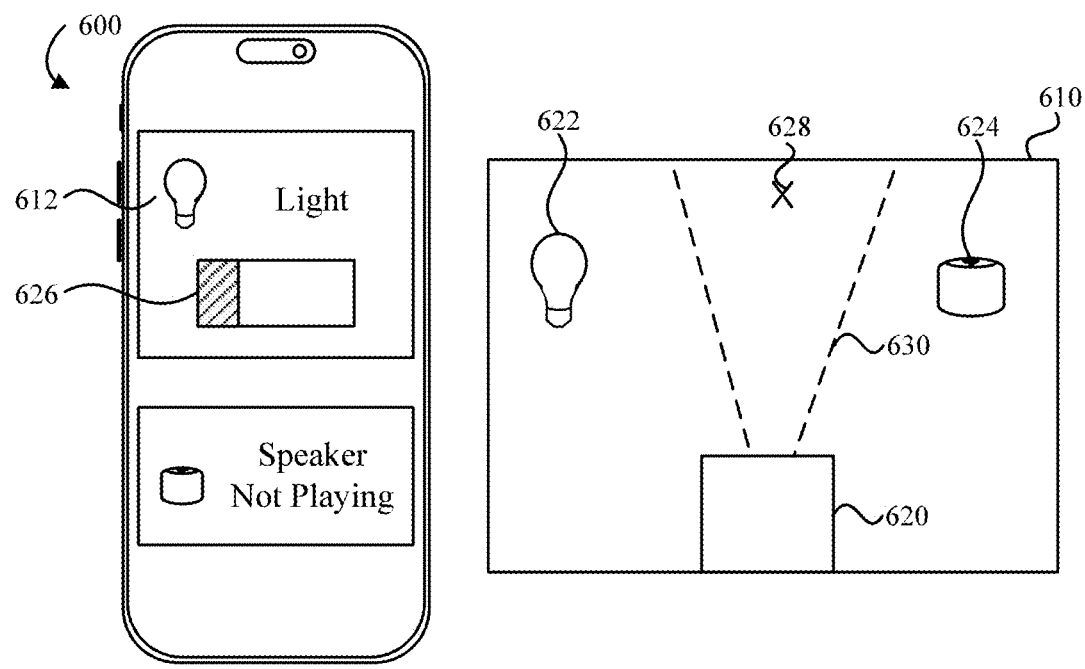

At FIG. 2D, in response to detecting input 605*c*, computer system 600 transmits one or more instructions to the one or more light devices. The instructions correspond to the input 605*c*. Input 605*c* is a swipe from right to left that signifies that the user would like to decrease the power level of the one or more light devices by the amount indicated by the (length of the) swipe. The sent instructions then cause the power level of the one or more light devices to decrease by the amount indicated (e.g., from a 50% power level to a 25% power level). Accordingly, as illustrated in FIG. 2D, computer system 600 displays power control user interface object 626 as a quarter filled (e.g., hatching fills a quarter of power control user interface object 626). As explained above, computer system 600 is configured to control the operation of the one or more light devices while computer system 600 displays power control user interface object 626. Put a different way, the display of power control user interface object 626 indicates that computer system 600 is configured to control the one or more light devices.

At FIG. 2D, as illustrated by schematic 610, location indicator 628 is positioned between representation of one or more light devices 622 and representation of one or more speaker devices 624. Further, neither representation of one or more light devices 622 nor representation of one or more speaker devices 624 are within field-of-detection indicator 630. Accordingly, at FIG. 2D, the one or more speaker devices and the one or more light devices are not in the field-of-detection of computer system 600 and computer system 600 is not directed to the one or more speaker devices nor the one or more light devices.

As illustrated in FIG. 2D, computer system 600 displays power control user interface object 626 within light control user interface object 612. Accordingly, at FIG. 2C, as explained above, computer system 600 is configured to control the one or more light devices that correspond to light control user interface object 612. Computer system 600 remains configured to control the one or more light devices though computer system 600 is not directed to the one or more light devices because computer system 600 detects input 605*c* (e.g., at FIG. 2B) while the computer system 600 is directed to the one or more light devices.

Computer system 600 remains configured to control the one or more light devices until computer system 600 makes a determination that computer system 600 and/or user attention is directed to a different external device (e.g., the one or more speaker devices) for the predetermined amount of time. In some embodiments, in response to detecting an input directed to computer system 600 at FIG. 2D, computer system 600 causes the one or more light devices to be adjusted.

In some embodiments, computer system 600 ceases to be configured to control the one or more light devices when a determination is made that computer system 600 or the user's attention (e.g., gaze) is not directed to the one or more light devices for a predetermined amount of time. In some embodiments, computer system 600 ceases to be configured to control the one or more light devices in response to computer system 600 detecting an input (e.g., a tap input, swipe input, voice command, long press (e.g., tap and hold), a rotational input, a swipe input, an air gesture, a gaze input and/or hand gesture, mouse clicks, and/or head movement inputs) while computer system 600 is not directed at the one or more light devices. In some embodiments, computer system 600 ceases to be configured to control the one or more light devices when a determination is made that a user has not gazed at the one or more light devices for a predetermined amount of time. In some embodiments, in response to detecting a different input than input 605*c*, computer system 600 displays one or more different options for controlling the one or more light devices. These options may be different from the slider presented via power control user interface object 626 at FIG. 2D, such as one or more options that control one or more colors of one or more light devices 622 and/or one or more options that control whether the one or more light devices 622 turn on and/or turn off automatically based on one more conditions (e.g., time conditions, conditions of the environment (e.g., ambient light in the environment and/or temperature of the environment)). At FIG. 2D, computer system 600 is moved to the right within the physical environment.

Figure 2E:
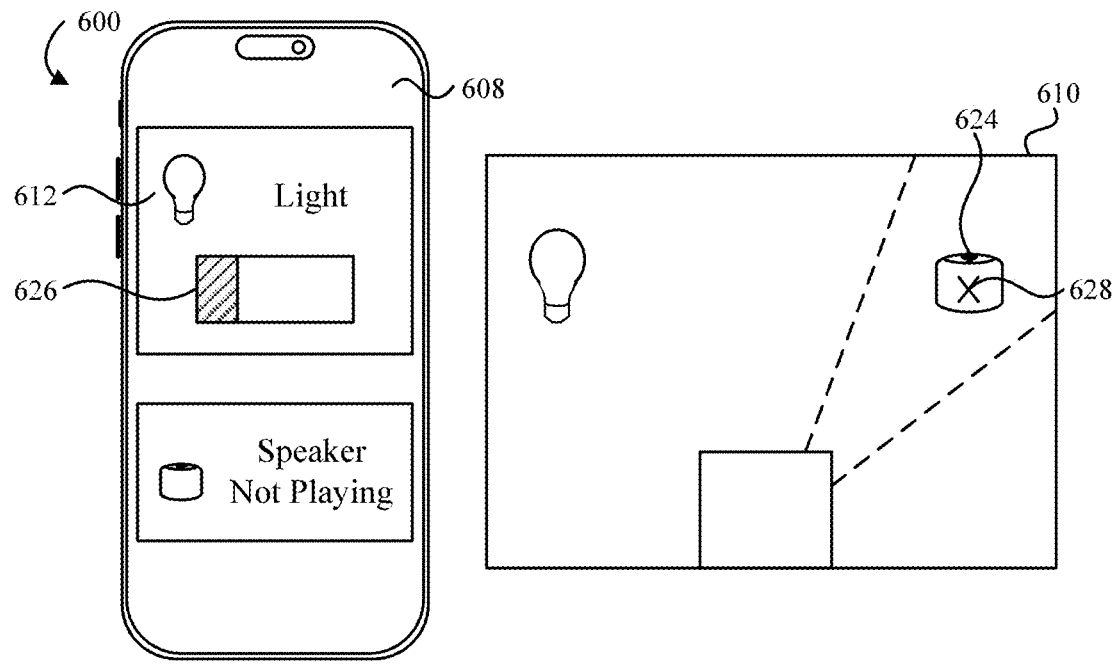

At FIG. 2E, after computer system 600 is moved (or moves) to the right within the physical environment, computer system 600 is directed to the one or more speaker devices that correspond to representation of speaker devices 624 (e.g., as illustrated by location indicator 628 in schematic 610). At FIG. 2E, a determination is made that computer system 600 is directed to the one or more speaker devices for less than the predetermined time period. At FIG. 2E, because a determination is made that computer system 600 is directed to the one or more speaker devices for less than the predetermined time, computer system 600 remains configured to control the operation of the one or more light devices that correspond to light control user interface object 612. Accordingly, as illustrated in FIG. 2E, computer system 600 displays power control user interface object 626 within light control user interface object 612. In some embodiments, when computer system 600 does not detect an input while computer system 600 is directed to the one or more light devices, computer system 600 ceases to display power control user interface object 626 when a determination is made that computer system 600 is no longer directed to the one or more light devices. In some embodiments, computer system 600 is configured to control the one or more speaker devices when a determination is made that computer system 600 is directed to the one or more speaker devices (e.g., and not when a determination is made that computer system 600 is directed to the one or more speaker devices for greater than the predetermined period of time).

Figure 2F:
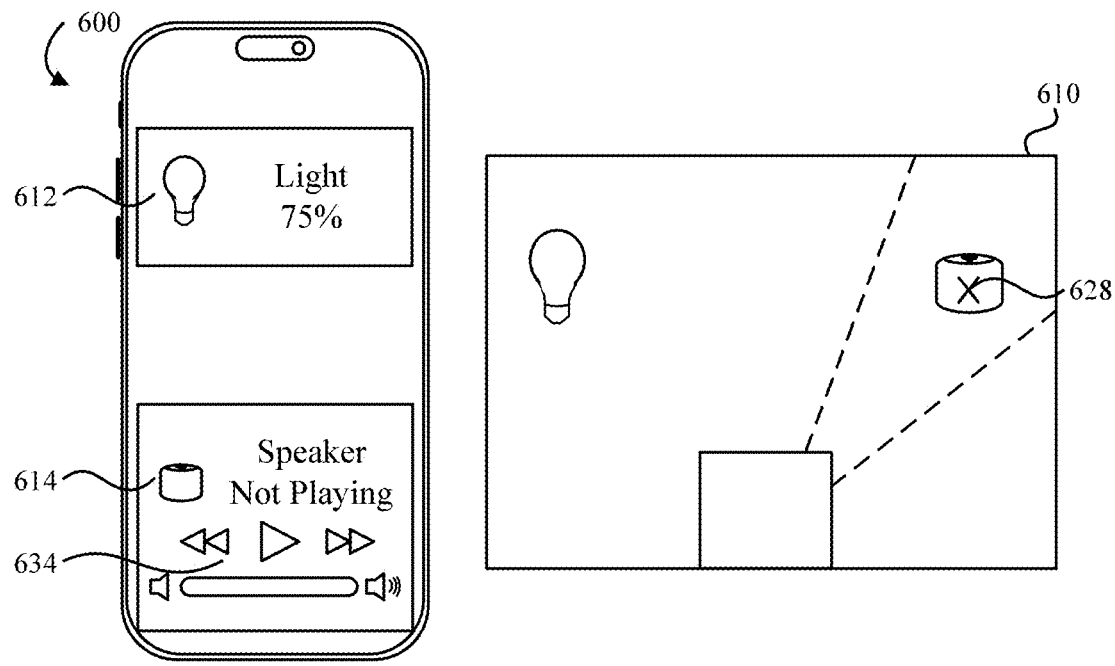

At FIG. 2F, computer system 600 remains directed to the one or more speaker devices (e.g., as illustrated by location indicator 628 in schematic 610). At FIG. 2F, a determination is made (e.g., by computer system 600) that computer system 600 has been directed to the one or more speaker devices for the predetermined time period (and/or for more than the predetermined period of time). Because a determination is made that computer system 600 has been directed to the one or more speaker devices for the predetermined time period, computer system 600 expands display of speaker control user interface object 614. As illustrated in FIG. 2F, as part of expanding the display of speaker control user interface object 614, computer system 600 displays playback controls user interface object 634 within speaker control user interface object 614.

Like power control user interface object 626, the display of playback controls user interface object 634 indicates that computer system 600 is configured to control the one or more speaker devices. That is, while computer system 600 displays playback controls user interface object 634, computer system 600 can control the playback of the one or more speaker devices. Computer system 600 transmits one or more instructions to the one or more speaker devices that cause the playback status of the one or more speaker devices (e.g., adjusts the volume of the playback of a media item, pause the playback of a media item, proceed to a different media item in a queue, and/or initiate the playback of a media item) to be modified in response to computer system 600 detecting an input that corresponds to selection of playback controls user interface object 634. In some embodiments, as a part of displaying speaker control user interface object 614 as expanded, computer system 600 ceases to display light control user interface object 612. In some embodiments, computer system 600 does not detect an input while computer system 600 is directed to the one or more speaker devices. In examples where computer system 600 does not detect an input while computer system 600 is directed to the one or more speaker devices, computer system 600 ceases to display playback controls user interface object 634 when a determination is made that computer system 600 (and/or user attention) is no longer directed to the one or more speaker devices. In examples where computer system 600 does not detect an input while computer system 600 is directed to the one or more speaker devices, computer system 600 does not display an indication that computer system 600 is configured to control the one or more speaker devices when a determination is made that computer system 600 is directed to a direction that does not correspond to the location of the one or more speaker devices.

Figure 2G:
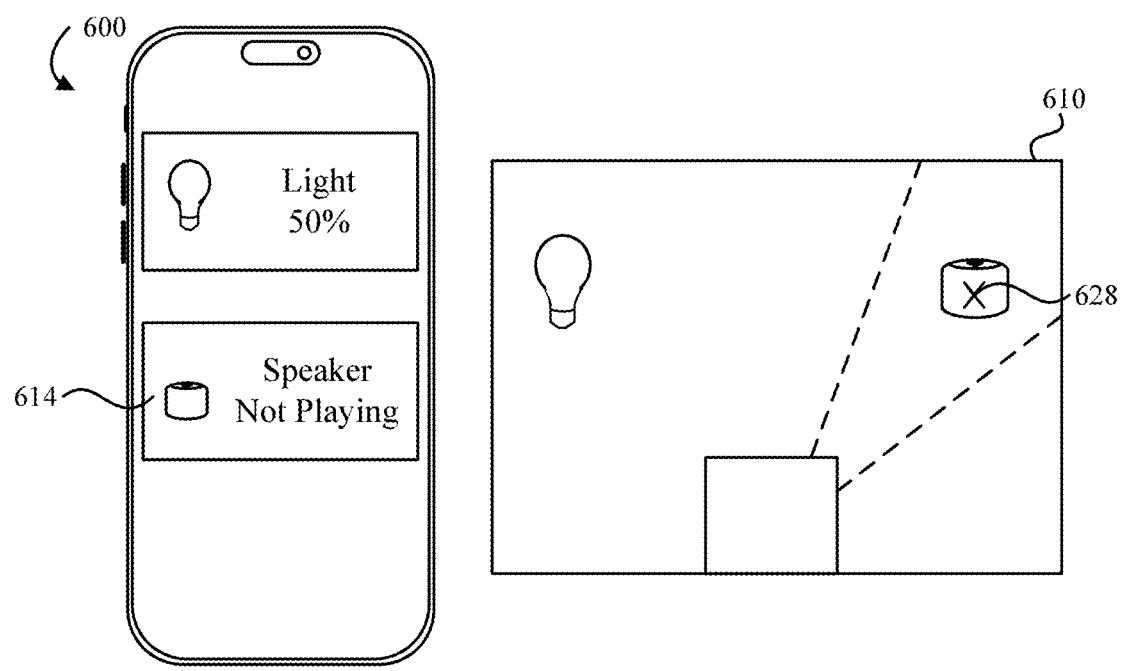

At FIG. 2G, computer system 600 remains directed to the one or more speaker devices (e.g., as illustrated by location indicator 628 in schematic 610). At FIG. 2G, a determination is made (e.g., by computer system 600) that computer system 600 has remained inactive (e.g., computer system 600 has not detected a particular type of input and/or any inputs and/or computer system 600 is in a sleep mode) for more than a threshold period of inactivity (e.g., 0.5-60 minutes) while computer system 600 is directed to the one or more speaker devices. Because a determination is made that computer system 600 has remained inactive for more than the threshold period of inactivity while computer system 600 is directed to the one or more speaker devices, computer system 600 ceases displaying speaker control user interface object 614 as expanded.

In some embodiments, computer system 600 displays a set of controls on a particular side of display 608 of computer system 600 based on detecting input (and/or an intent to control). In some embodiments, the input corresponds to the particular side of display 608 (as illustrated in FIG. 2A) on which the set of controls are displayed. In some embodiments, the computer system 600 detects an input directed to the right side of computer system 600 and displays a set of controls along the right side of display 608 of computer system 600 without displaying one or more controls along the left side of display 608 of computer system 600. In some embodiments, computer system 600 detects an input directed to the left of computer system 600 and displays the set of controls along the left side of display 608 of computer system 600 without displaying one or more controls along the right side of display 608 of computer system 600. Thus, in some embodiments, the set of controls are only displayed on the particular side of display 608 based on which side the input is directed. More information will be provided below corresponding the type of input and/or the set of controls.

In some embodiments, computer system 600 displays the set of one or more controls on a particular side of display 608 in response to detecting an intent to control computer system 600 and/or in response to detecting that computer system 600 is being used to change one or more operations at an external device. In some embodiments, the intent to control is detected in response to detecting an air gesture that is directed to a particular side of computer system 600 and/or within a predetermined distance (e.g., 0.1-5 meters) from a display (e.g., display 608 and/or a display that is external to computer system 600). In some embodiments, the intent to control is detected in response to detecting an input, e.g., a touch input, that is directed to the particular side of display 608. In some embodiments, the intent to control is detected in response to detecting that the gaze of a user is directed to a particular side and/or area of computer system 600 and/or within a predetermined distance (e.g., 0.1-5 meters) from a particular side and/or area of computer system 600. In some embodiments, the intent to control is detected in response to detecting that a hand and/or another body part of the user is directed to an area and/or side of computer system 600. In some embodiments, the intent to control is detected in response to detecting that the user is in a certain position (e.g., sitting, standing, and/or kneeling) relative to computer system 600 and/or an external structure (e.g., passenger side, driver side, back side, and/or front side).

In some embodiments, the set of controls are controls for controlling a particular region of a display of an external structure. In some of these examples, the state of one or more external devices that are located and/or directed to the left side of the external structure (e.g., a set of blinds on a left side of a house, driver's side light, a driver's side vent, and/or a driver's side window) is modified in response to the detection of the selection a set of controls displayed on the left side of display 608, while the state of one or more external devices that are located and/or directed to the right side of the external structure is modified in response to the detection of the selection of a set of controls displayed on the right side of display 608 In some embodiments, controls on the right side of display 608 and controls on the left side of display 608 include a common control that is used to control the same device, such as a sound system and/or an air conditioning device. In some of these examples, this same device is a device can be a local device or a global device. In some embodiments, a global device is directed to multiple areas of a physical environment and/or sides of computer system 600. In some embodiments, a local device is directed to one side of computer system 600 and/or a single area of a physical environment. In some embodiments, the set of controls are displayed on a particular side of computer system 600 until the input is no longer detected and/or directed to the side of computer system 600 for a predetermined period of time. In some embodiments, selection of one or more of the controls causes computer system 600 to change the state of an external device (e.g., local and/or global device) that corresponds to the selected control.

FIGS. 3A-3B is a flow diagram illustrating a method (e.g., process 700) for controlling one or more electronic devices in accordance with some examples. Some operations in process 700 are, optionally, combined, the orders of some operations are, optionally, changed, and some operations are, optionally, omitted.

As described below, process 700 provides an intuitive way for controlling one or more electronic devices. Process 700 reduces the cognitive burden on a user for controlling one or more electronic devices, thereby creating a more efficient human-machine interface. For battery-operated computing devices, enabling a user to control one or more electronic devices faster and more efficiently conserves power and increases the time between battery charges.

In some embodiments, process 700 is performed at a computer system (e.g., 600) that is in communication with a display component (e.g., 608) (e.g., a display screen and/or a touch-sensitive display). In some embodiments, the computer system is a watch, a phone, a tablet, a processor, a head-mounted display (HMD) device, and/or a personal computing device. In some embodiments, the computer system is in communication with one or more cameras (e.g., one or more telephoto, wide angle, and/or ultra-wide-angle cameras). In some embodiments, the computer system is in communication with one or more input devices (e.g., a physical input mechanism (e.g., a hardware input mechanism, a rotatable input mechanism, a crown, a knob, a dial, a physical slider, and/or a hardware button), a camera, a touch-sensitive display, a microphone, and/or a button). In some embodiments, the display component is included in the computer system. In some embodiments, the display component is not included in the computer system and is not included the respective device. In some embodiments, the computer system is a remote that includes a display.

The computer system detects (702) that the computer system (e.g., 600) is being pointed in a direction of a first device (e.g., 622 and/or 624) (e.g., a watch, a phone, a tablet, a display, a fan, a thermostat, a window, a door, and/or speaker) for at least a predetermined period of time (e.g., as described above in relation to FIG. 2C).

In response to detecting that the computer system (e.g., 600) is being pointed in the direction of the first device (e.g., 622 and/or 624) for at least the predetermined period of time (e.g., as described above in relation to FIG. 2C) (e.g., 1-10 seconds), the computer system displays (704), via the display component (e.g., 608), an indication that the computer system is configured to control the first device (e.g., as described in relation to FIG. 2C and 2F). In some embodiments, the indication includes a representation (e.g., textual representation, a graphical representation, and/or a symbol) of the first device. In some embodiments, the first region and the second region are regions of the same surface.

While displaying the indication that the computer system (e.g., 600) is configured to control the first device (e.g., 622 and/or 624), the computer system detects (706) that the computer system is being pointed in a second direction for at least the predetermined period of time, wherein the second direction is different from the first direction (e.g., as described above in relation to FIGS. 2D and 2E).

In response to (708) detecting that the computer system is being pointed in the second direction for at least the predetermined period of time and in accordance with (710) a determination that the second direction is a direction of a second device (e.g., 622 and/or 624) (e.g., a watch, a phone, a tablet, a display, a fan, a thermostat, a window, a door, and/or speaker) that can be controlled by the computer system (e.g., 600) and an input (e.g., 605c) (e.g., a selection input and/or a tap input) (and, in some embodiments, a non-tap input, such as a mouse click, gaze input, voice command, air gesture (e.g., a tap air gesture, a pinch gesture, and/or a flicking air gesture)) was detected by the computer system while the computer system was pointed in the first direction, the computer system displays (712), via the display component (e.g., 608), an indication (e.g., as described above in relation to FIG. 2F) (e.g., a graphical indication, a textual indication, and/or a symbolic indication) that the computer system (e.g., 600) is configured to control the second device (e.g., 622 and/or 624), wherein the second device is different from (e.g., different graphical representation/indication, different textual representation/indication., and/or different symbolic representation/indication) the first device (e.g., 622 and/or 624).

In response to (708) detecting that the computer system is being pointed in the second direction for at least the predetermined period of time and in accordance with (710) the determination that the second direction is the direction of the second device that can be controlled by the computer system and an input was detected by the computer system while the computer system was pointed in the first direction, the computer system ceases (714) display of the indication that the computer system (e.g., 600) is configured to control the first device (e.g., 622 and/or 624).

In response to (708) detecting that the computer system is being pointed in the second direction for at least the predetermined period of time and in accordance with (716) a determination that the second direction is not a direction of a respective device (e.g., the second device and/or another device) that can be controlled by the computer system (e.g., 600) (e.g., as described above in relation to FIG. 2D) and the input (e.g., 605c) was detected by the computer system while the computer system was pointed in the first direction, the computer system continues to display the indication that the computer system is configured to control the first device (e.g., 622 and/or 624) (e.g., as described above in relation to FIG. 2D) (e.g., without displaying the indication that the computer system is configured to control the second device). In some embodiments, the indication that the computer system is configured to control the first device continues to be displayed while the computer system is determined to be pointed at another device that can be controlled by the computer system for less than the predetermined period of time (e.g., 1-120 seconds) when the input was detected by the computer system while the computer system was pointed in the first direction. In response to detecting that the computer system is being pointed in the second direction for at least the predetermined period of time while displaying the indication that the computer system is configured to control the first device, selectively continuing to display the indication that the computer system is configured to control the first device allows the computer system to selectively continue to be able to control the first device and to display such, thereby providing improved visual feedback to the user, providing additional control options without cluttering the user interface with additional displayed controls, and/or performing an operation when a set of conditions has been met without requiring further user input.

In some embodiments, while displaying, via the display component (e.g., 608), the indication that the computer system (e.g., 600) is configured to control the first device (e.g., 622 and/or 624) (e.g., as described above in relation to FIG. 2C) (and, in some embodiments, while detecting that the computer system is being pointed in the direction of the first device), the computer system detects a first input (e.g., 605c) directed to the computer system. In some embodiments, in response to detecting the first input directed to the computer system, the computer system causes a characteristic of the first device to be adjusted (e.g., as described above in relation to FIG. 2D) (e.g., without causing a characteristic of the second device to be adjusted). Causing the characteristic of the first device to be adjusted in response to detecting the first input directed to the computer system allows the computer system to control a state of the characteristic of the first device, thereby providing additional control options without cluttering the user interface with additional displayed controls and/or performing an operation when a set of conditions has been met without requiring further user input.

In some embodiments, while displaying, via the display component (e.g., 608), the indication that the computer system (e.g., 600) is configured to control the second device (e.g., 622 and/or 624) (e.g., as described above in relation to FIGS. 2C and 2F) (and, in some embodiments, while detecting that the computer system is being pointed in the direction of the second device), the computer system detects a second input (e.g., 605c) directed to the computer system. In some embodiments, in response to detecting the second input directed to the computer system, the computer system causes a characteristic of the second device to be adjusted (e.g., as described in relation to FIGS. 2D and 2F) (e.g., without causing a characteristic of the first device to be adjusted). Causing the characteristic of the second device to be adjusted in response to detecting the second input directed to the computer system allows the computer system to control a state of the characteristic of the second device, thereby providing additional control options without cluttering the user interface with additional displayed controls and/or performing an operation when a set of conditions has been met without requiring further user input.

In some embodiments, the first device (e.g., 622 and/or 624) is a first type (e.g., a watch, a phone, a tablet, a display, a fan, a thermostat, a window, a door, and/or speaker) of device. In some embodiments, the second device (e.g., 622 and/or 624) is a second type of device that is different from the first type of device (e.g., as described above in relation to FIG. 2A). Having the computer system control different types of devices by pointing at different devices allows the computer system to intuitively, quickly, and/or easily control the different types of devices, thereby providing additional control options without cluttering the user interface with additional displayed controls and/or performing an operation when a set of conditions has been met without requiring further user input.

In some embodiments, while displaying the indication that the computer system (e.g., 600) is configured to control the first device (e.g., 622 and/or 624) (e.g., as described above in relation to FIGS. 2C and 2F), the computer system is configured to control a first type of characteristic of the first device. In some embodiments, while displaying the indication that the computer system is configured to control the second device (e.g., 622 and/or 624), the computer system is configured to control a second type of characteristic of the second device. In some embodiments, the first type of characteristic is different from the second type of characteristic (e.g., position of a window and/or door, tint of a window and/or door, output of a fan, output of a heating element, output of a speaker, and/or configuration of a thermostat) (e.g., as described above in relation to FIGS. 2C and 2F). Configuring the computer system to control different types of characteristics of the first device and the second device allows the computer system to intuitively, quickly, and/or easily control the different types of characteristics, thereby providing additional control options without cluttering the user interface with additional displayed controls and/or performing an operation when a set of conditions has been met without requiring further user input.

In some embodiments, the computer system displays, via the display component (e.g., 608), a plurality of controls (e.g., 612 and/or 614), wherein the indication that the computer system (e.g., 600) is configured to control the first device (e.g., 622 and/or 624) is not displayed in an area (e.g., an area on a user interface of an application and/or a user interface on the application) that includes the plurality of controls, and wherein the indication that the computer system is configured to control the second device (e.g., 622 and/or 624) is not displayed in the area that includes the plurality of controls. In some embodiments, display of the indication that the computer system is configured to control the second device replaces display of the indication that the computer system is configured to control the first device, in accordance with a determination that the second direction is the direction of the second device that can be controlled by the computer system and the input was detected by the computer system while the computer system was pointed in the first direction. In some embodiments, the plurality of controls is displayed on/near a first side and on/near a first edge of a display while the indication that the computer system is configured to control the first device and/or the indication that the computer system is configured to control the first device is displayed on/near a second side and/or edge of the display that is different from the first side and/or edge. Displaying the indications that the computer system is configured to control the first device and the second device in an area that is different from where the plurality of controls are displayed allows for the computer system to maintain the area where the plurality of controls are displayed while still displaying the indications in different locations, thereby providing improved visual feedback to the user, providing additional control options without cluttering the user interface with additional displayed controls, and/or performing an operation when a set of conditions has been met without requiring further user input.

In some embodiments, in accordance with a determination that the second direction is not in a direction of a respective device that can be controlled by the computer system (e.g., 600) (e.g., as described above in relation to FIG. 2D) and the input was not detected by the computer system while the computer system was pointed in the first direction, the computer system ceases to display the indication that the computer system is configured to control the first device (e.g., 622 and/or 624) (e.g., as described above in relation to FIG. 2D) (and, In some embodiments, the computer system does not display the indication that the computer system is configured to control the second device, wherein the second device is different from the first device). Ceasing to display the indication that the computer system is configured to control the first device in accordance with the determination that the second direction is not in a direction of a respective device that can be controlled by the computer system and the input was not detected by the computer system while the computer system was pointed in the first direction allows the computer system to change what is displayed to be related to what the computer system determines to be what a user wants, thereby providing improved visual feedback to the user, reducing the number of inputs needed to perform an operation, providing additional control options without cluttering the user interface with additional displayed controls, and/or performing an operation when a set of conditions has been met without requiring further user input.

In some embodiments, in accordance with a determination that the second direction is not a direction of a respective device that can be controlled by the computer system (e.g., 600) (e.g., as described above in relation to FIG. 2D) and the input (e.g., 605c) was not detected by the computer system while the computer system was pointed in the first direction, the computer system forgoes displaying an indication that the computer system is configured to control a respective device (e.g., any device and any indication) (e.g., as described above in relation to FIG. 2D). Not displaying the indication that the computer system is configured to control a respective device in accordance with the determination that the second direction is not a direction of a respective device that can be controlled by the computer system and the input was not detected by the computer system while the computer system was pointed in the first direction allows the computer system to display what the computer system determines to be what a user wants to control (and if the computer system determines that the user does not want to control anything then it does not display any indications for controlling devices), thereby providing improved visual feedback to the user, reducing the number of inputs needed to perform an operation, providing additional control options without cluttering the user interface with additional displayed controls, and/or performing an operation when a set of conditions has been met without requiring further user input.

Note that details of the processes described above with respect to process 700 (e.g., FIGS. 3A-3B) are also applicable in an analogous manner to other methods described herein. For example, process 800 optionally includes one or more of the characteristics of the various methods described above with reference to process 700. For example, a computer system can display an indication that the computer system is configured to control a respective device using one or more techniques described above in relation to process 700 while the computer system displays the first set of one or more controls or the second set of one or more controls using the one or more techniques described above in relation to 800.

FIG. 4 is a flow diagram illustrating a method (e.g., process 800) for displaying controls in accordance with some examples. Some operations in process 800 are, optionally, combined, the orders of some operations are, optionally, changed, and some operations are, optionally, omitted.

As described below, process 800 provides an intuitive way for displaying controls. Process 800 reduces the cognitive burden on a user for displaying controls, thereby creating a more efficient human-machine interface. For battery-operated computing devices, enabling a user to display controls faster and more efficiently conserves power and increases the time between battery charges.

In some embodiments, process 800 is performed at a computer system (e.g., 600) that is in communication with a display component (e.g., 608) (e.g., a display screen and/or a touch-sensitive display) and one or more input devices (e.g., a physical input mechanism (e.g., a hardware input mechanism, a rotatable input mechanism, a crown, a knob, a dial, a physical slider, and/or a hardware button), a camera, a touch-sensitive display, a microphone, and/or a button). In some embodiments, the computer system is a watch, a phone, a tablet, a processor, a head-mounted display (HMD) device, and/or a personal computing device. In some embodiments, the computer system is in communication with one or more cameras (e.g., one or more telephoto, wide angle, and/or ultra-wide-angle cameras).

The computer system detects (802) an intent to control (e.g., a body part (e.g., a hand), a pointer, and/or gaze that is within a predetermined distance away from the display and/or an air gesture and/or gaze that is directed to the display and/or a position that is within a predetermined distance from the display) a display (e.g., of the display component and/or the display) (e.g., as described above in relation to description following FIG. 2G).

In response to (804) detecting the intent to control the display and in accordance with (806) a determination that the intent to control is directed to a first portion of the display, the computer system displays (, via the display component (e.g., 608), a first set of one or more controls in the first portion of the display without displaying a second set of one or more controls, wherein the first set of one or more controls includes a first control that, when selected, (e.g., via a tap input) (and, in some embodiments, a non-tap input, such as a mouse click, gaze input, voice command, air gesture (e.g., a tap air gesture, a pinch gesture, and/or a flicking air gesture)) causes (e.g., via the computer system) a first device that is associated with a first region (e.g., of a display, the computer system, an area, a region, a container, and/or a room) and not a second region (e.g., of a display, the computer system, an area, a region, a container, and/or a room) to perform a first operation (e.g., as described above in relation to description following FIG. 2G).

In response to (804) detecting the intent to control the display and in accordance with (808) a determination that the intent to control is directed to a second portion of the display that is different from the first portion of the display, the computer system displays, via the display component (e.g., 608), the second set of one or more controls in the second portion of the display without displaying the first set of one or more controls, wherein the second set of one or more controls includes a second control that, when selected (e.g., via a tap input) (and, in some embodiments, a non-tap input, such as a mouse click, gaze input, voice command, air gesture (e.g., a tap air gesture, a pinch gesture, and/or a flicking air gesture)), causes (e.g., via the computer system) a second device that is associated with the second region (e.g., of the computer system and/or of an area) and not the first region to perform a second operation (e.g., as described above in relation to description following FIG. 2G). In some embodiments, the first set of one or more controls does not include the second control and/or a control that, when selected, causes a device that is associated with the second region to perform an operation (e.g., the first operation, the second operation, and/or another operation). In some embodiments, the second set of one or more controls does not include the first control and/or a control that, when selected, causes a device that is associated with the first region to perform an operation (e.g., the first operation, the second operation, and/or another operation). In some embodiments, the first operation is different from the second operation. In some embodiments, the first operation is the same as the first operation. In some embodiments, the second control is different from the first control. In some embodiments, the first control is displayed with a value corresponding to the first device and the second control is displayed with a value corresponding to the second device. In some embodiments, the value corresponding to the first device is different from the value corresponding to the second device. Selectively displaying different sets of one or more controls in different portions of the display allows for the computer system to intelligently and/or contextually display controls to a user in portions in which the computer system determines to be better for the user, thereby providing improved visual feedback to the user, reducing the number of inputs needed to perform an operation, providing additional control options without cluttering the user interface with additional displayed controls, and/or performing an operation when a set of conditions has been met without requiring further user input.

In some embodiments, the first operation and the second operation are a same (e.g., a same type of operation) operation (e.g., as described above in relation to description following FIG. 2G). In some embodiments, the first operation is the second operation. In some embodiments, the first operation includes the second operation. In some embodiments, the second operation includes the first operation.

In some embodiments, the first portion of the display is closer to (e.g., closer in distance and/or proximity) the first region than the second portion of the display. In some embodiments, the second portion of the display is closer to the second region than the first portion of the display (e.g., as described above in relation to description following FIG. 2G). Displaying a set of one or more controls closer to a region in which it is determined that the user intends to control allows for the user to more easily and/or quickly interact with the set of one nor more controls, thereby reducing the time needed to perform an operation, providing additional control options without cluttering the user interface with additional displayed controls, and/or performing an operation when a set of conditions has been met without requiring further user input.

In some embodiments, the first set of one or more controls includes a respective control (e.g., a volume control, a speaker controls, and/or a global control that, when selected, causes output that impacts the first region and the second region) (e.g., as described above in relation to description following FIG. 2G). In some embodiments, the second set of one or more controls includes the respective control (e.g., as described above in relation to description following FIG. 2G). In some embodiments, the respective control is initially displayed as being selected when the first set of one or more controls is displayed and when the second set of one or more controls is displayed (e.g., as described above in relation to description following FIG. 2G). Including the same control in the first region and the second region as selected allows for the computer system to surface what it believes is what the user wishes to interact with regardless of a region in which it is determined that the user intends to control, thereby reducing the number of inputs needed to perform an operation, reducing the time needed to perform an operation, providing additional control options without cluttering the user interface with additional displayed controls, and/or performing an operation when a set of conditions has been met without requiring further user input.

In some embodiments, while displaying the respective control, the computer system detects an input (e.g., a tap input) (and, in some embodiments, a non-tap input, such as a mouse click, gaze input, voice command, air gesture (e.g., a tap air gesture, a pinch gesture, and/or a flicking air gesture)) directed to the respective control (e.g., as described above in relation to description following FIG. 2G). In some embodiments, in response to detecting the input directed to the respective control, the computer system causes output of a respective device to change, wherein the respective device is associated with the first and the second region (e.g., as described above in relation to description following FIG. 2G). In response to detecting the input directed to the respective control, causing output of the respective device to change allows for a user to control devices associated with multiple regions (e.g., the first region and the second region), thereby reducing the number of inputs needed to perform an operation, reducing the time needed to perform an operation, providing additional control options without cluttering the user interface with additional displayed controls, and/or performing an operation when a set of conditions has been met without requiring further user input.

In some embodiments, displaying the respective control as being selected includes displaying, via the display component (e.g., 608), the respective control with a first brightness level concurrently with displaying a non-selected control (e.g., of the first set of one or more controls and/or of the second set of one or more control) with a second brightness level that is lower than the first brightness level (e.g., as described above in relation to description following FIG. 2G). Displaying selected controls at a higher brightness level than unselected controls allows for a user to quickly and/or certainly distinguish between which control is selected, thereby providing improved visual feedback to the user, reducing the number of inputs needed to perform an operation, reducing the time needed to perform an operation, and/or performing an operation when a set of conditions has been met without requiring further user input.

In some embodiments, in response to detecting the intent to control the display and in accordance with a determination that the intent to control is directed to a third portion of the display that is different from the first portion and the second portion of the display, the computer system displays, via the display component (e.g., 608), a third set of one or more controls in the third portion of the display without displaying the first set of one or more controls and the second set of controls (e.g., as described above in relation to description following FIG. 2G). In some embodiments, the third set of one or more controls includes a third control that, when selected, causes (e.g., via the computer system) a third device that is associated with the third region (e.g., of the computer system and/or of an area) and not the first region and second region to perform a third operation (e.g., as described above in relation to description following FIG. 2G). Displaying the third set of one or more controls in the third portion of the display without displaying the first set of one or more controls and the second set of controls allows for the computer system to intelligently and/or contextually display controls to a user in portions in which the computer system determines to be better for the user, thereby providing improved visual feedback to the user, reducing the number of inputs needed to perform an operation, providing additional control options without cluttering the user interface with additional displayed controls, and/or performing an operation when a set of conditions has been met without requiring further user input.

In some embodiments, after detecting the intent to control the display and in accordance with a determination that the intent to control the display has not been detected for a predetermined period of time (e.g., 1-60 seconds), the computer system forgoes displaying the first set of one or more controls and the second set of one or more controls (e.g., and/or ceasing to the display the first set of one or more controls if the first set of one or more controls were displayed in response to detecting the intent to control or ceasing to the display the second set of one or more controls if the second set of one or more controls were displayed in response to detecting the intent to control) (e.g., as described above in relation to description following FIG. 2G). In some embodiments, in accordance with a determination that the intent to control the display has been detected for the predetermined period of time, the computer system continues displaying the first set of one or more controls and/or the second set of one or more controls. In some embodiments, while displaying the first set of one or more controls, the computer system detects a second intent to control the display that is different from the intent to control the display (and, in some embodiments, while detecting the intent to control the display), and in response to detecting the second intent to control the display and in accordance with a determination that the intent to control is directed to the first portion of the display that is different from the second portion of the display, the computer system concurrently displays the second set of one or more controls and the second set of one or more controls (e.g., as described above in relation to description following FIG. 2G). In accordance with the determination that the intent to control the display has not been detected for the predetermined period of time, forgoing displaying the first set of one or more controls and the second set of one or more controls allows the computer system to selectively display different sets of one or more controls based on whether it is determined that the user has an intent to control, thereby providing improved visual feedback to the user, providing additional control options without cluttering the user interface with additional displayed controls, and/or performing an operation when a set of conditions has been met without requiring further user input.

In some embodiments, detecting the intent to control the display includes detecting a gaze of the user that is directed to a second respective region (e.g., first region, second region, and/or a different region). Detecting the gaze of the user to detect the intent to control allows for such detection to be performed with minimal and/or less user action (e.g., than actual pressing of a button), thereby reducing the number of inputs needed to perform an operation, reducing the time needed to perform an operation, providing additional control options without cluttering the user interface with additional displayed controls, and/or performing an operation when a set of conditions has been met without requiring further user input.

In some embodiments, detecting the intent to control the display includes detecting a body part (e.g., hand, arm, foot, and/or finger) of a user that is directed to a second respective region (e.g., first region, second region, and/or a different region). Detecting the body part of the user to detect the intent to control allows for such detection to be performed when a user is about to and/or in a position to want to perform the operations, thereby providing improved visual feedback to the user, reducing the number of inputs needed to perform an operation, providing additional control options without cluttering the user interface with additional displayed controls, and/or performing an operation when a set of conditions has been met without requiring further user input.

In some embodiments, detecting the intent to control the display includes detecting an air gesture (e.g., that is, in some embodiments, directed to a second respective region (e.g., first region, second region, and/or a different region)).

In some embodiments, detecting the intent to control the display includes detecting that a user is in a position (e.g., a sitting position, a standing position, and/or a kneeling position). In some embodiments, the position is location in a physical environment. In some embodiments, the position is a type of position. Detecting that the user is in the position to detect the intent to control allows for such detection to be catered and/or specific to particular contexts (e.g., based on the position), thereby providing improved visual feedback to the user, reducing the number of inputs needed to perform an operation, providing additional control options without cluttering the user interface with additional displayed controls, and/or performing an operation when a set of conditions has been met without requiring further user input.

Note that details of the processes described above with respect to process 800 (e.g., FIG. 4) are also applicable in an analogous manner to the methods described herein. For example, process 700 optionally includes one or more of the characteristics of the various methods described above with reference to process 800. For example, a computer system can display an indication that the computer system is configured to control a respective device using one or more techniques described above in relation to process 700 while the computer system displays the first set of one or more controls or the second set of one or more controls using the one or more techniques described above in relation to 800. For brevity, these details are not repeated below.

This disclosure, for purpose of explanation, has been described with reference to specific embodiments. The discussions above are not intended to be exhaustive or to limit the disclosure and/or the claims to the specific embodiments. Modifications and/or variations are possible in view of the disclosure. Some embodiments were chosen and described in order to explain principles of techniques and their practical applications. Others skilled in the art are thereby enabled to utilize the techniques and various embodiments with modifications and/or variations as are suited to a particular use contemplated.

Although the disclosure and embodiments have been fully described with reference to the accompanying drawings, it is to be noted that various changes and/or modifications will become apparent to those skilled in the art. Such changes and/or modifications are to be understood as being included within the scope of this disclosure and embodiments as defined by the claims.

It is the intent of this disclosure that any personal information of users should be gathered, managed, and handled in a way to minimize risks of unintentional and/or unauthorized access and/or use.

Therefore, although this disclosure broadly covers use of personal information to implement one or more embodiments, this disclosure also contemplates that embodiments can be implemented without the need for accessing such personal information.

What is claimed is:

1. A method, comprising:
at a computer system that is in communication with a display component:
detecting that the computer system is being pointed in a direction of a first device for at least a predetermined period of time;
in response to detecting that the computer system is being pointed in the direction of the first device for at least the predetermined period of time, displaying, via the display component, an indication that the computer system is configured to control the first device;
while displaying the indication that the computer system is configured to control the first device, detecting that the computer system is being pointed in a second direction for at least the predetermined period of time, wherein the second direction is different from the first direction; and
in response to detecting that the computer system is being pointed in the second direction for at least the predetermined period of time:
in accordance with a determination that the second direction is a direction of a second device that can be controlled by the computer system and an input was detected by the computer system while the computer system was pointed in the first direction:
displaying, via the display component, an indication that the computer system is configured to control the second device, wherein the second device is different from the first device; and
ceasing display of the indication that the computer system is configured to control the first device; and
in accordance with a determination that the second direction is not a direction of a respective device that can be controlled by the computer system and the input was detected by the computer system while the computer system was pointed in the first direction, continuing to display the indication that the computer system is configured to control the first device.

2. The method of claim 1, further comprising:
while displaying, via the display component, the indication that the computer system is configured to control the first device, detecting a first input directed to the computer system; and
in response to detecting the first input directed to the computer system, causing a characteristic of the first device to be adjusted.

3. The method of claim 1, further comprising:
while displaying, via the display component, the indication that the computer system is configured to control the second device, detecting a second input directed to the computer system; and
in response to detecting the second input directed to the computer system, causing a characteristic of the second device to be adjusted.

4. The method of claim 1, wherein the first device is a first type of device, and wherein the second device is a second type of device that is different from the first type of device.

5. The method of claim 1, wherein:
while displaying the indication that the computer system is configured to control the first device, the computer system is configured to control a first type of characteristic of the first device;
while displaying the indication that the computer system is configured to control the second device, the computer system is configured to control a second type of characteristic of the second device; and
the first type of characteristic is different from the second type of characteristic.

6. The method of claim 1, further comprising:
displaying, via the display component, a plurality of controls, wherein the indication that the computer system is configured to control the first device is not displayed in an area that includes the plurality of controls, and wherein the indication that the computer system is configured to control the second device is not displayed in the area that includes the plurality of controls.

7. The method of claim 1, further comprising:
in accordance with a determination that the second direction is not in a direction of a respective device that can be controlled by the computer system and the input was not detected by the computer system while the computer system was pointed in the first direction, ceasing to display the indication that the computer system is configured to control the first device.

8. The method of claim 1, further comprising:
in accordance with a determination that the second direction is not a direction of a respective device that can be controlled by the computer system and the input was not detected by the computer system while the computer system was pointed in the first direction, forgoing displaying an indication that the computer system is configured to control a respective device.

9. A non-transitory computer-readable storage medium storing one or more programs configured to be executed by one or more processors of a computer system that is in communication with a display component, the one or more programs including instructions for:
detecting that the computer system is being pointed in a direction of a first device for at least a predetermined period of time;
in response to detecting that the computer system is being pointed in the direction of the first device for at least the predetermined period of time, displaying, via the display component, an indication that the computer system is configured to control the first device;
while displaying the indication that the computer system is configured to control the first device, detecting that the computer system is being pointed in a second direction for at least the predetermined period of time, wherein the second direction is different from the first direction; and
in response to detecting that the computer system is being pointed in the second direction for at least the predetermined period of time:
in accordance with a determination that the second direction is a direction of a second device that can be controlled by the computer system and an input was detected by the computer system while the computer system was pointed in the first direction:

displaying, via the display component, an indication that the computer system is configured to control the second device, wherein the second device is different from the first device; and ceasing display of the indication that the computer system is configured to control the first device; and in accordance with a determination that the second direction is not a direction of a respective device that can be controlled by the computer system and the input was detected by the computer system while the computer system was pointed in the first direction, continuing to display the indication that the computer system is configured to control the first device.

10. The non-transitory computer-readable storage medium of claim 9, wherein the instructions are further for:
while displaying, via the display component, the indication that the computer system is configured to control the first device, detecting a first input directed to the computer system; and
in response to detecting the first input directed to the computer system, causing a characteristic of the first device to be adjusted.

11. The non-transitory computer-readable storage medium of claim 9, wherein the instructions are further for:
while displaying, via the display component, the indication that the computer system is configured to control the second device, detecting a second input directed to the computer system; and
in response to detecting the second input directed to the computer system, causing a characteristic of the second device to be adjusted.

12. The non-transitory computer-readable storage medium of claim 9, wherein the first device is a first type of device, and wherein the second device is a second type of device that is different from the first type of device.

13. The non-transitory computer-readable storage medium of claim 9, wherein:
while displaying the indication that the computer system is configured to control the first device, the computer system is configured to control a first type of characteristic of the first device;
while displaying the indication that the computer system is configured to control the second device, the computer system is configured to control a second type of characteristic of the second device; and
the first type of characteristic is different from the second type of characteristic.

14. The non-transitory computer-readable storage medium of claim 9, wherein the instructions are further for:
displaying, via the display component, a plurality of controls, wherein the indication that the computer system is configured to control the first device is not displayed in an area that includes the plurality of controls, and wherein the indication that the computer system is configured to control the second device is not displayed in the area that includes the plurality of controls.

15. The non-transitory computer-readable storage medium of claim 9, wherein the instructions are further for:
in accordance with a determination that the second direction is not in a direction of a respective device that can be controlled by the computer system and the input was not detected by the computer system while the computer system was pointed in the first direction, ceasing to display the indication that the computer system is configured to control the first device.

16. The non-transitory computer-readable storage medium of claim 9, wherein the instructions are further for:
in accordance with a determination that the second direction is not a direction of a respective device that can be controlled by the computer system and the input was not detected by the computer system while the computer system was pointed in the first direction, forgoing displaying an indication that the computer system is configured to control a respective device.

17. A computer system that is in communication with a display component, comprising:
one or more processors; and
memory storing one or more programs configured to be executed by the one or more processors, the one or more programs including instructions for:
detecting that the computer system is being pointed in a direction of a first device for at least a predetermined period of time;
in response to detecting that the computer system is being pointed in the direction of the first device for at least the predetermined period of time, displaying, via the display component, an indication that the computer system is configured to control the first device;
while displaying the indication that the computer system is configured to control the first device, detecting that the computer system is being pointed in a second direction for at least the predetermined period of time, wherein the second direction is different from the first direction; and
in response to detecting that the computer system is being pointed in the second direction for at least the predetermined period of time:
in accordance with a determination that the second direction is a direction of a second device that can be controlled by the computer system and an input was detected by the computer system while the computer system was pointed in the first direction:
displaying, via the display component, an indication that the computer system is configured to control the second device, wherein the second device is different from the first device; and
ceasing display of the indication that the computer system is configured to control the first device; and
in accordance with a determination that the second direction is not a direction of a respective device that can be controlled by the computer system and the input was detected by the computer system while the computer system was pointed in the first direction, continuing to display the indication that the computer system is configured to control the first device.

18. The computer system of claim 17, wherein the instructions are further for:
while displaying, via the display component, the indication that the computer system is configured to control the first device, detecting a first input directed to the computer system; and
in response to detecting the first input directed to the computer system, causing a characteristic of the first device to be adjusted.

19. The computer system of claim 17, wherein the instructions are further for:

while displaying, via the display component, the indication that the computer system is configured to control the second device, detecting a second input directed to the computer system; and in response to detecting the second input directed to the computer system, causing a characteristic of the second device to be adjusted.

20. The computer system of claim 17, wherein the first device is a first type of device, and wherein the second device is a second type of device that is different from the first type of device.

21. The computer system of claim 17, wherein:

while displaying the indication that the computer system is configured to control the first device, the computer system is configured to control a first type of characteristic of the first device;

while displaying the indication that the computer system is configured to control the second device, the computer system is configured to control a second type of characteristic of the second device; and the first type of characteristic is different from the second type of characteristic.

22. The computer system of claim 17, wherein the instructions are further for:

displaying, via the display component, a plurality of controls, wherein the indication that the computer system is configured to control the first device is not displayed in an area that includes the plurality of controls, and wherein the indication that the computer system is configured to control the second device is not displayed in the area that includes the plurality of controls.

23. The computer system of claim 17, wherein the instructions are further for:

in accordance with a determination that the second direction is not in a direction of a respective device that can be controlled by the computer system and the input was not detected by the computer system while the computer system was pointed in the first direction, ceasing to display the indication that the computer system is configured to control the first device.

24. The computer system of claim 17, wherein the instructions are further for:

in accordance with a determination that the second direction is not a direction of a respective device that can be controlled by the computer system and the input was not detected by the computer system while the computer system was pointed in the first direction, forgoing displaying an indication that the computer system is configured to control a respective device.

* * * * *